United States Patent [19]
Moriarty et al.

[11] Patent Number: 6,052,744
[45] Date of Patent: Apr. 18, 2000

[54] SYSTEM AND METHOD FOR TRANSFERRING CONCURRENT MULTI-MEDIA STREAMS OVER A LOOSELY COUPLED I/O BUS

[75] Inventors: Michael P. Moriarty, Spring; Thanh T. Tran, Houston; Thomas J. Bonola, Tomball, all of Tex.

[73] Assignee: Compaq Computer Corporation, Houston, Tex.

[21] Appl. No.: 08/933,675

[22] Filed: Sep. 19, 1997

[51] Int. Cl.[7] ................................................ F04B 15/02
[52] U.S. Cl. ................................................. 710/27; 710/28
[58] Field of Search ............................... 710/22–28, 52, 710/7, 38; 714/9; 379/908

[56] References Cited

U.S. PATENT DOCUMENTS

| | | | |
|---|---|---|---|
| 5,276,845 | 1/1994 | Takayama | 395/425 |
| 5,613,162 | 3/1997 | Kanenjian | 710/22 |
| 5,799,150 | 8/1998 | Hamilton et al. | 709/203 |
| 5,809,261 | 9/1998 | Lambrecht | 710/128 |
| 5,867,626 | 2/1999 | Kawakami et al. | 386/108 |

*Primary Examiner*—Joseph E. Palys
*Assistant Examiner*—Ronald D Hartman, Jr.
*Attorney, Agent, or Firm*—Conley, Rose & Tayon, PC; Kevin L. Daffer

[57] ABSTRACT

A multimedia system including a PCI bus master controller for transferring concurrent and independent video and audio data streams to video and audio devices. The controller includes a video request and DMA channel, a video sub-picture request and DMA channel, an audio request and DMA channel, and a decompressed video DMA and posted request channel for independently and concurrently transferring the data streams from host memory to the devices. The host processor builds lists of request packets in system memory and asynchronously submits the request packets to the controller. The request packets include commands which the request channels execute. The commands may include spinning on status conditions in registers of the multimedia devices, writing to registers of the devices, or performing bus master transfers of multimedia data streams from system memory to the devices. The device register accesses are performed by the controller on local buses thereby reducing PCI bus traffic.

7 Claims, 13 Drawing Sheets

SYSTEM AND METHOD FOR TRANSFERRING CONCURRENT MULTI-MEDIA STREAMS OVER A LOOSELY COUPLED I/O BUS

BACKGROUND OF THE INVENTION

1. Field of the Invention

This invention relates to multimedia computer systems, and in particular to concurrent transfer of multiple multimedia data streams in multimedia computer systems.

2. Description of the Related Art

Multimedia computers have become very popular and pervasive. A typical multimedia computer system includes a processor and system memory coupled together along with some form of permanent storage media, such as a magnetic disk drive or CDROM. The storage device is typically coupled to the system memory by an I/O bus, such as an Industry Standard Architecture (ISA) bus. Video data, such as compressed motion picture video images or still images, are stored on the storage media. The system also includes video devices, such as MPEG decoders or video digital to analog converters (DACs), which receive digital video data and produce images on video displays, such as motion pictures or still images, from the video data. Typically, the video devices are also coupled to the computer system by the I/O bus.

The system processor is responsible for reading the video data from the storage device into system memory over the I/O bus and then writing the video data back over the I/O bus to the video device. Typically, the processor provides the video data to the video device one chunk at a time. That is, the processor provides one chunk, such as a video frame, at a time, then waits for the video device to acknowledge receipt of the data, then provides another chunk, and so on. In some cases the processor actually reads each byte of the data from the system memory and writes each byte to the device. In other systems the processor programs a direct memory access controller (DMAC) to perform the data transfer. In other cases the device may be sophisticated enough to perform the transfer of data from system memory to itself and notify the processor of the completion of the transfer. Even in this latter case, often the processor must sit polling for the transfer to complete. This operation is undesirable if the processor is executing a multitasking operating system, such as Microsoft® Windows NT or the UNIX® operating systems, since the processor could be devoting remaining bandwidth to the execution of other processes.

Typically, the video data is supplied as streams of data frames to the video devices. An important characteristic of multimedia systems is that, generally speaking, the video streams must be supplied to the video devices at a minimum frame rate. That is, a maximum time between video frames exists within which the next frame of data must be supplied to the video device. (The inverse of the maximum frame time is commonly referred to as the minimum frame rate, or frame rate.) Otherwise, the undesirable distortions will occur. For example, in the case of motion video, a visible pause will be observed in the motion video if data is not supplied to the video device at the frame rate thereby causing a movie to look choppy.

Furthermore, multimedia systems also include audio devices, such as an audio decoder for decompressing compressed audio data or an audio DAC. These audio devices must also receive data at a minimum rate in order to avoid producing annoying distortion of the fidelity of the reproduced audio which may result if the data is not supplied to the audio device at the required sample rate. The audio devices are also typically coupled to the I/O bus and the processor provides audio to them in a similar manner as to the video devices. In addition, the multimedia system may also include audio devices which receive audio, such as through a microphone, and convert the audio into digital audio data to be stored within or processed by the computer system. These audio devices also require processor bandwidth to program the transfer of the audio data from the audio device to the system memory. If the processor does not transfer the audio data from the audio device to the system memory at a sufficient rate, buffers within the audio device will overrun and cause some of the audio data to be lost. Typically, the processor services one stream of data at a time to one of the devices, which may cause starvation to one or more of the devices due to lack of concurrency.

Sometimes in multimedia system such as those described above, audio or video distortion may occur due to failure to provide data at the minimum transfer rate required. Or, even if the required data rates are supplied, often a significant and sometimes unacceptable amount of the processor's bandwidth is consumed with orchestrating the video and audio data transfers between the system memory and the audio and video devices. This renders the computer system effectively unusable for any other purpose.

Causes of these problems include the wasted processor time between the multimedia device notifying the processor of the completion of a data transfer and the processor submitting the next data transfer request to the device. This is commonly referred to as latency.

The problems described above are exacerbated by the fact that in multimedia computers such as the ones described above, thrashing of the I/O bus occurs due to the processor accessing control and status registers of the I/O devices in order to control the transfer of data from the system memory to the audio and video devices. Typically, each read by the processor from a location on the I/O bus causes write posting buffers within the host bus to I/O bus bridge to be flushed before the read may be satisfied. This is costly in terms of I/O bus bandwidth and because the processor must wait amounts of time which are relatively extremely long compared to the clock cycle time of the processor. This reduces the effective bandwidth of the processor to perform other tasks, such as controlling the transfer of other multimedia data streams within the system.

Therefore, a more efficient multimedia system is desired which mitigates the latency, processor bandwidth, lack of concurrency, audio and video distortion, and I/O bus thrashing problems present in current multimedia systems.

SUMMARY OF THE INVENTION

The problems outlined above are in large part solved by the multimedia system of the present invention. The system employs an I/O bus master controller which operates to transfer video and audio data streams from a system memory to video and audio devices coupled to the controller in an independent and concurrent fashion. Preferably, the controller is coupled to an I/O bus, such as a Peripheral Component Interconnect (PCI) bus. The controller advantageously enables the system processor to be decoupled from the video and audio devices, thereby improving the performance and efficiency of the system. The processor is enabled to asynchronously submit request packets to the controller, thereby reducing latency. The request packets reside in system memory and include commands which the controller performs in relation to the devices. For example, a command may instruct the controller to poll for certain conditions in a status register of one of the devices, an operation which the processor would have performed in prior art systems. One advantage is that processor bandwidth is reclaimed. Another advantage is that thrashing of the PCI bus is avoided, since the controller performs the operations on a local bus between the controller and device and the processor submits request packets via system memory and receives completed request packets via system memory. At most, one PCI write cycle is required by the processor, preferably to ring a doorbell of the controller, to submit a request packet list. In addition, the controller is enabled to asynchronously complete request packets to the processor in system memory, thereby reducing latency. The reclaimed processor bandwidth, reduced latency and PCI bus thrashing may all minimize the possibility of audio or video distortion which could be caused by failure to meet required minimum multimedia data rates.

The controller advantageously is operable to perform concurrent transfers of the video and audio data streams from the memory to the devices. The controller includes a plurality of DMA channels, at least one dedicated to each device, which operate concurrently and independently to perform the data transfers. The controller further includes a plurality of request channels, which concurrently and independently fetch request packets from the system memory. The DMA channels and request channels include FIFO buffers which temporarily store data and request packets from the system memory. The buffers serve to minimize the impact of PCI bus arbitration latency and speed mismatches between the PCI bus and the devices. The controller further includes an interface to the PCI bus for transferring data from the PCI bus to the channels. Preferably, the bus interface receives transfer request signals from the channels when the buffers reach a low water mark, thereby giving higher priority to more empty channels to reduce the possibility of a device being starved for data. Thus, the controller enables the concurrent and independent transfer of data streams, unlike previous systems, thereby minimizing the possibility of video or audio distortion.

The controller further includes a video sub-picture request and DMA channel for receiving commands and transferring data associated with video sub-pictures to be displayed. The separate and concurrent transfers of the video sub-picture data similarly reduce the possibility of distortion of the video sub-picture. Examples of video sub-pictures include overlayed text, such as weather reports, sporting event scores or movie navigation information.

The controller further includes a decompressed audio DMA channel and a posted request channel for transferring data from a microphone, for example, which must be asynchronously transferred from the controller to system memory. The decompressed audio channel may also be used to transfer decompressed audio data which was decompressed by the audio device being used as a decompression engine. In this configuration, the compressed audio data is transferred from system memory to the decompression engine using the normal audio channel, and the decompressed data is transferred from the decompression engine, i.e., audio device, back to system memory. The controller also provides the capability for multimedia data to be transferred from another device within the system, rather than from system memory.

In one embodiment, the audio and/or video devices includes the ability to perform decompression of audio or video data, such as MPEG decompression. The controller enables selective hardware/software decompression of the multimedia data, preferably based upon available bandwidth. For example, if the system processor detects that the video device is busy decompressing data and the system processor has available bandwidth, the processor may choose to decompress the data in software, i.e., using the system processor. In such case the processor decompresses the data into system memory and then requests the controller to transfer the decompressed data from system memory to the video device. However, the processor may dynamically elect to send the compressed data to the video device and have the video device decompress the data.

Broadly speaking, the multimedia system includes a processor, an I/O bus, and a system memory operably coupled together. The system further includes a video device, an audio device and a controller coupling the audio and video devices to the I/O bus. The controller includes a video direct memory access (DMA) channel operably coupled between the I/O bus and the video device for transferring video data streams from the system memory to the video device. The controller includes a video request channel operably coupled to the I/O bus for fetching request packets from the system memory and controlling the video DMA channel to transfer the video data streams in response to commands in the request packets. The controller also includes an audio DMA channel operably coupled between the I/O bus and the audio device for transferring audio data streams from the system memory to the audio device. The controller also includes an audio request channel operably coupled to the I/O bus for fetching request packets from the system memory and controlling the audio DMA channel to transfer the audio data streams in response to commands in the request packets. The DMA channels are operable to transfer the data streams and the request channels are operable to fetch the request packets from the system memory independent of and concurrent with data transfers across the DMA channels.

BRIEF DESCRIPTION OF THE DRAWINGS

Other objects and advantages of the invention will become apparent upon reading the following detailed description and upon reference to the accompanying drawings in which.

Figure 1:
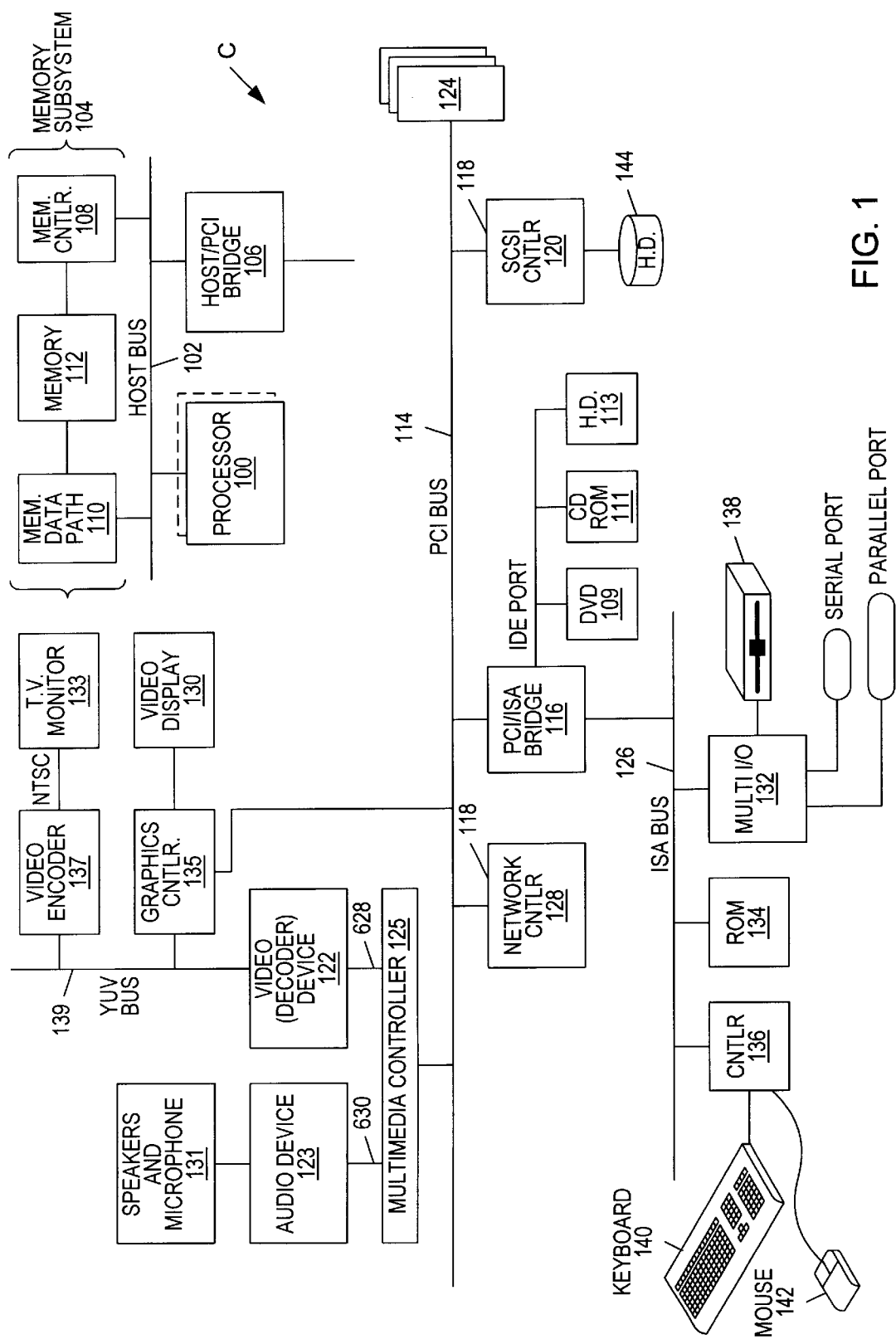
FIG. 1 is a block diagram of a multimedia computer system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Multimedia System

Referring to FIG. 1, a block diagram of a multimedia computer system C according to the preferred embodiment of the present invention is illustrated. The system C includes a multimedia controller 125 according to the preferred embodiment of the present invention, which will be described in more detail below. The computer system C includes one or more processors 100, such as an Intel Pentium Pro processor, or the like. Although only one processor 100 is shown, the present invention is not limited to single processor computers. The processor 100 is coupled to a host bus 102.

Also coupled to the host bus 102 is a memory subsystem 104 and a host-to-PCI bridge device 106, such as an Intel 82454KX or the like. The host-to-PCI bridge device translates processor cycles into peripheral component interconnect (PCI) cycles, and vice versa, for connecting to a PCI bus 114. The memory subsystem 104 is itself comprised of a memory controller 108, such as an Intel 82453KX or the like, a memory data path device 110, such as an Intel 82452KX or the like, and a main memory array 112. The memory controller 108 provides address and control signals to the main memory 112, which is comprised of a plurality of dynamic random access memory (DRAM) devices (not specifically shown). The memory data path device 110 works in conjunction with the memory controller 108 to provide buffering between a data portion of the host bus 102 and the plurality of DRAMs. Of course, other well known variations of memory subsystems could be utilized.

Also connected to the PCI bus 114 is a PCI/ISA (industry standard architecture) bridge 116, one or more PCI bus masters 118, such as a small computer system interface (SCSI) controller 120 and a network interface controller 128. Further connected to the PCI bus 114 are one or more PCI slots 124. The PCI/ISA bridge 116 translates PCI cycles into ISA bus cycles, and vice versa, for connecting to an ISA bus 126. The PCI/ISA bridge 116 also integrates an enhanced direct memory access (DMA) controller, an interrupt controller, a timer/counter, and non-maskable interface logic as well as decode logic for various peripheral devices. Preferably, the PCI/ISA bridge 116 also comprises an Integrated Drive Electronics (IDE) port for coupling peripherals with an IDE interface, such as a hard drive 113, a CDROM drive 111 and/or a digital video disk (DVD) drive 109. The IDE peripherals may store audio and/or video data. The SCSI controller 120 is connectable to a SCSI peripheral, such as a hard disk 144, tape drive and CD-ROM. The network interface controller 128 includes various interface circuitry for connecting to an ethernet network, or alternatively, a token ring network. The SCSI controller 120 and network controller 128 are but two of many examples of bus masters, which are collectively called PCI bus masters 118. It is noted that principles disclosed herein are applicable to other buses besides the PCI bus 114 that support bus mastering, such as ISA or EISA.

The ISA bus 126 further connects to a multi I/O device 132, a read only memory (ROM) 134 and a keyboard controller 136. The multi I/O device includes a floppy disk controller for connecting to a floppy disk drive 138. Also contained in the multi I/O device are a number of serial port and parallel port circuits. The ROM provides low level code for initiating the hardware upon power up. The keyboard controller handles communication with a keyboard 140 and a mouse 142.

A multimedia controller 125 is also coupled to the PCI bus 114 according to the preferred embodiment of the present invention. In other embodiments, the multimedia controller 125 is more tightly coupled to the processor 100 and memory subsystem 104, rather than coupled to the PCI bus 114. The multimedia controller 125 advantageously provides a means for the processor 100 to provide streams of audio and video data from the system memory 112 to an audio device 123 and a video device 122 and to transfer audio data streams from the audio device 123 to the system memory in a concurrent, independent manner. As a result, the audio and video integrity are improved and the overall performance of the system C is improved.

The multimedia controller 125 is coupled to a video device 122 by a video bus 628. In the embodiment of FIG. 1, the video device 122 comprises a video decoder. Preferably, the video decoder comprises an MPEG-2 decoder, such as an SGS-Thompson ST3520 MPEG-2 video decoder. The video decoder receives compressed video data, such as MPEG-2 compressed video data, and decompresses the compressed video data into decompressed video data. The video decoder also generates necessary video timing signals, such as horizontal and vertical sync. In the embodiment of FIG. 1, the video bus 628 coupling the controller 125 to the video decoder comprises an 8-bit guest bus. Preferably, the video decoder provides the decompressed video data on a YUV (luminance and chrominance) bus 139. A graphics controller 135, such as an S3 Trio 54 V+, is coupled to the PCI bus 114 and receives video data from the PCI bus 114 for display on a video display 130, such as a VGA display monitor, coupled to the graphics controller 135. The graphics controller 135 also couples to the YUV bus 139 via a graphics port on the graphics controller 135. The graphics controller 135 receives decompressed video data via the graphics port and displays the decompressed video data, such as overlayed motion video over the graphics data received from the PCI bus 114, on the video display 130. Additionally, a video encoder 137, such as a Brooktree BT866 video encoder, may be coupled to the YUV bus 139. The video encoder 137 receives decompressed video data from the YUV bus 139 and converts the video data to an NTSC format for display on a television monitor 133 coupled to the video encoder 137. In one embodiment, a video camera (not shown) may provide NTSC format video data to a video decoder (not shown), such as a Philips Semiconductor SAA7111, coupled to the YUV bus 139 to display live video on the television monitor 133.

Figure 1A:
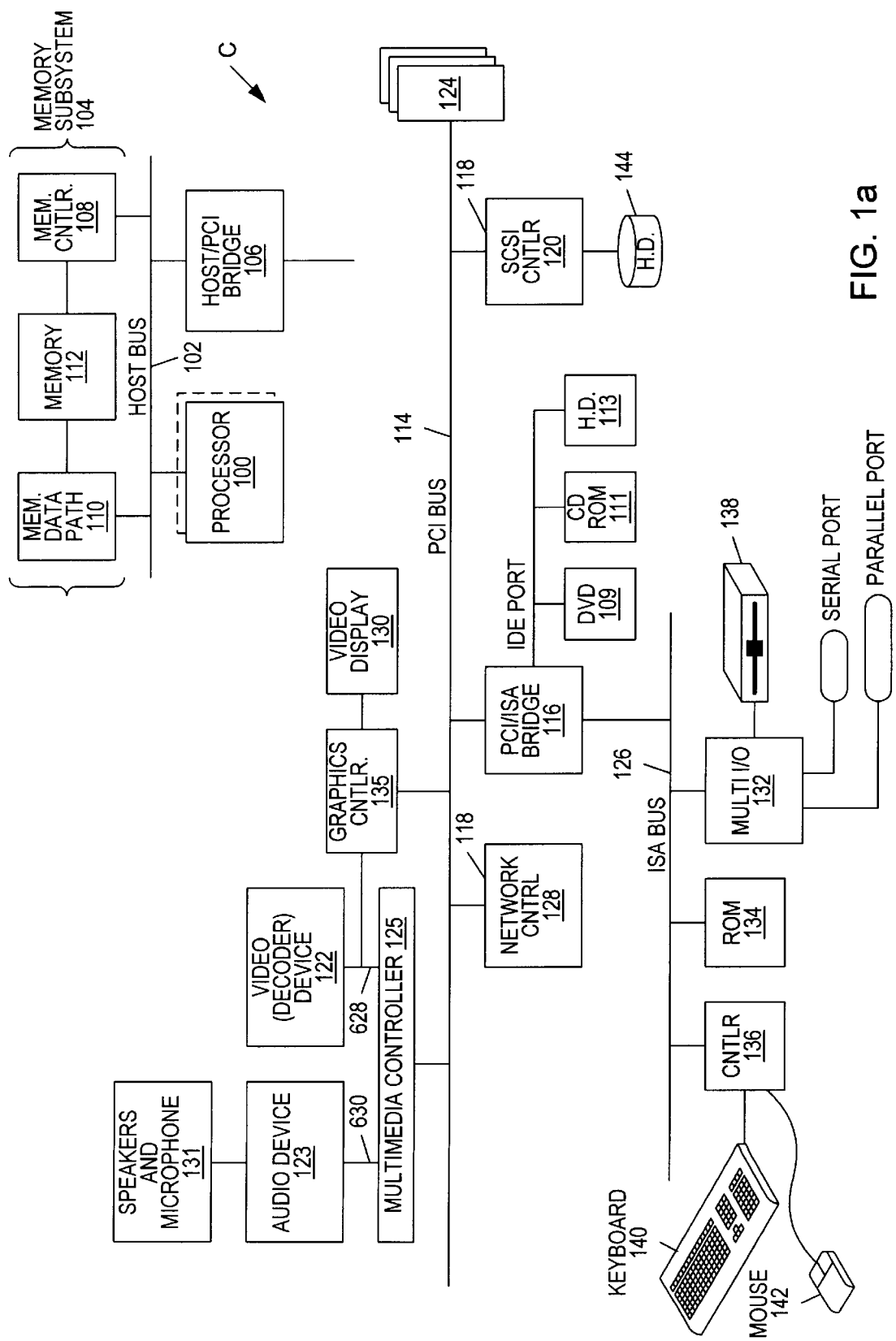
FIG. 1a is a block diagram of a multimedia computer system according to one embodiment of the present invention.

In the embodiment of FIG. 1a, the video device 122 comprises a video encoder, such as a Brooktree BT866 video encoder. The video encoder, also referred to as a video DAC, receives decompressed video data from the system memory 112 via the controller 125, and converts the video data to a composite analog signal, such as an NTSC format signal, for display on the television monitor 133. Preferably, the composite analog signal includes video timing and color information as well as the image information. Preferably, the processor 100 decompresses compressed video and places the decompressed video data in the system memory 112 for transfer by the controller 125 to the video encoder. In this embodiment, the controller 125 generates the necessary video timing signals, such as horizontal and vertical sync. In particular, preferably, a video interface circuit 624 (described below in FIG. 1b) generates the video timing signals. In the embodiment of FIG. 1a, the video bus 628 coupling the controller 125 to the video decoder preferably comprises a YUV bus. The graphics controller 135 couples to the video bus 628, i.e., the YUV bus. The graphics controller 135 and video display 130 operate in a similar manner as in the embodiment of FIG. 1.

The multimedia controller 125 is coupled to an audio device 123. The audio device 123 is coupled to sound devices such as speakers and/or a microphone 131. In one embodiment, the audio device 123 comprises an audio digital to analog converter (DAC). The audio DAC then converts the decompressed audio data into an analog audio signal which is provided to the speakers 131. In this embodiment, the processor 100 decompresses audio data and supplies the decompressed audio data to the audio DAC. An example of an audio DAC is the Crystal Semiconductor CS4333 DAC. In another embodiment, the audio device 123 comprises an audio decoder and an audio DAC coupled to the audio decoder. In this embodiment, the audio decoder receives compressed audio data, preferably in Dolby AC3 compressed audio format, decompresses the compressed audio data, and provides the decompressed audio data to the audio DAC. The audio DAC then converts the decompressed audio data into an analog audio signal which is provided to the speakers 131. An example of the audio decoder is the Zoran ZR38500 AC3 audio decoder.

Figure 1B:
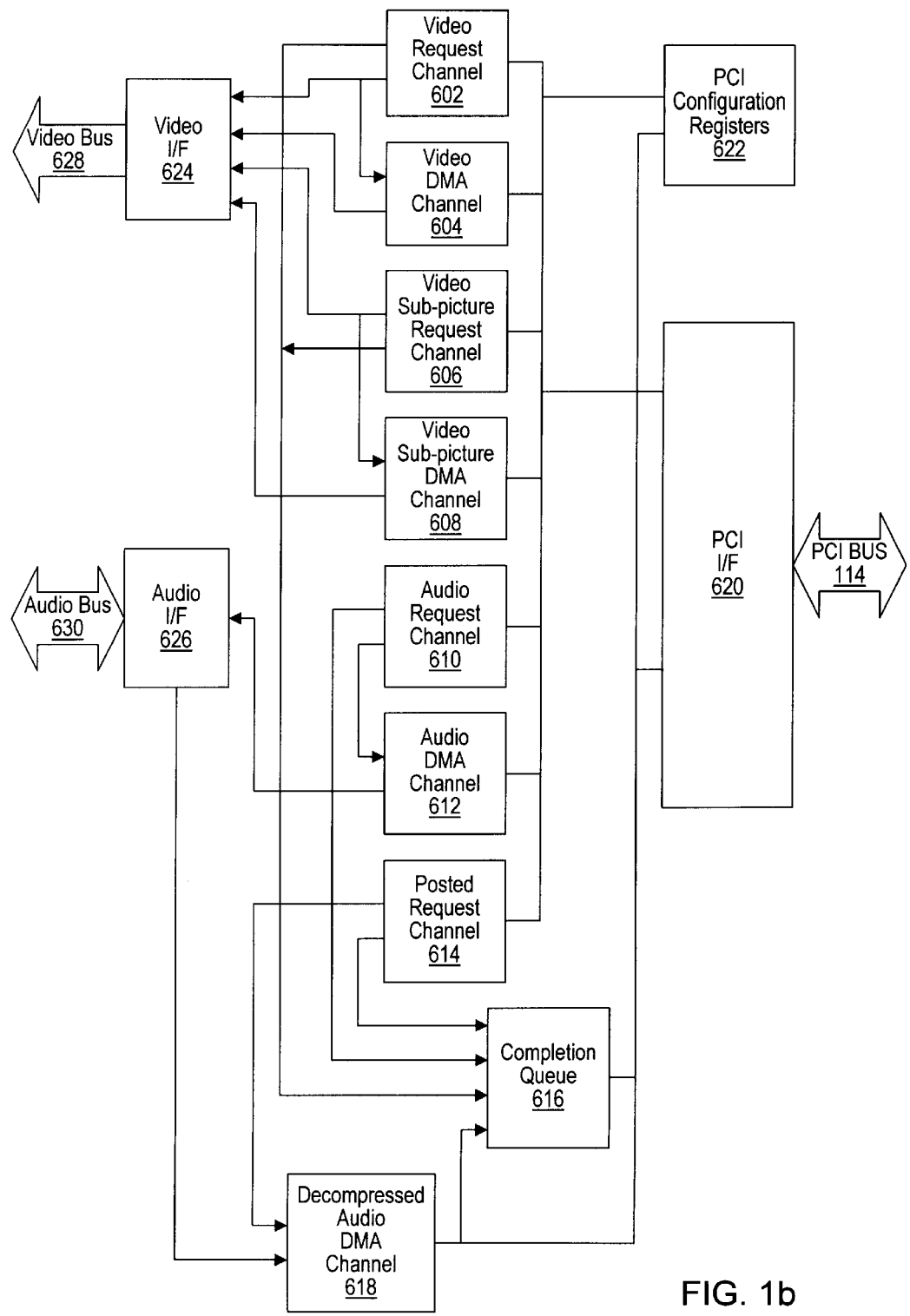
FIG. 1b is a block diagram of the multimedia controller of FIG. 1.

FIG. 1b—Multimedia Controller

Referring now to FIG. 1b, a block diagram of the multimedia controller 125 of FIG. 1 is shown. The controller 125 includes a plurality of request channels, direct memory access (DMA) channels and a completion queue 616 coupled between a PCI bus interface circuit 620 and a video interface circuit 624 and an audio interface circuit 626. The request channels include a video request channel 602, a video sub-picture request channel 606, an audio request channel 610 and a posted request channel 614. The DMA channels include a video DMA channel 604, a video sub-picture DMA channel 608, an audio DMA channel 612, and a decompressed audio channel 618. These request and DMA channels, along with the completion queue 616, are referred to collectively herein as "channels." Below, the "channels" are collectively referred to as a Distributed Burst Engine (DBE). The video, video sub-picture, audio and posted request channels 602, 606, 610 and 614 are referred to collectively as "request channels." The video, video sub-picture, audio and decompressed audio DMA channels 604, 608, 612 and 618 are referred to collectively as "DMA channels."

The PCI interface 620 is configured for coupling to the PCI bus 114. The PCI interface 620 is configured to operate as both a PCI bus master and a PCI bus slave. The PCI interface 620 is operable to obtain ownership of the PCI bus 114 and perform bus master data transfers between the system memory 112, or other PCI-addressable devices, and the channels of the controller 125. The PCI interface 620 is also operable as a target of PCI cycles, such as writes to or reads from registers within the channels by the processor 100. The channels provide physical addresses of locations in system memory 112, or other PCI-addressable devices, to the PCI bus interface 620. The PCI bus interface 620 uses the addresses to initiate transfers of data on the PCI bus 114 between the system memory 112, or other PCI-addressable devices, and the channels. Throughout the disclosure, references to transfers to/from system memory 112 are understood to include transfers to/from any PCI-addressable device in the system C.

The PCI bus interface 620 is operable to concurrently perform data transfers for each of the channels. This concurrent data transfer capability advantageously fosters a more fluid flow of data streams to the audio device 123 and video device 122. This fluid flow of the data streams enhances the likelihood of providing the data streams at the required minimum frame rate and thereby minimizes the possibility of distortion in the reproduced audio or video. A data stream may be defined as a plurality of data bytes which contain information, such as video information which collectively forms a video image or part of a video image, or audio information which collectively may be used to reproduce audio sounds, such as music or voice.

Preferably, the PCI bus interface 620 is also operable to receive priority information and to prioritize transfers of request packets and data streams according to the priority information. Thereby, the controller advantageously is capable of minimizing the possibility of one of the devices 122/123 starving the other device 122/123 for data and causing distortion in the reproduced audio or video. In the preferred embodiment, the channels generate signals to the bus interface 620 indicating that buffers (discussed below with reference to FIG. 6) within the channel have reached a low water mark. Thus, the bus interface 620 is requested to transfer data into the channel with the more empty buffer associated with a "low" channel receiving a higher priority than other channels. Preferably, the DMA channels are given higher priority than the request channels. In another embodiment, the processor 100 programs the priority information into registers of the controller 125.

The controller 125 further comprises PCI configuration registers 622 which may be read and written by the processor 100. The PCI configuration registers 622 are used for configuration purposes during initialization of the system C such as device identification and allocation and assignment of system resources, such as interrupt request, expansion ROM, register and shared memory addresses.

The video request channel 602 fetches request packets from the system memory 112 into buffers included in the video request channel 602. The video request channel 602 fetches the request packets in response to an indication from the processor 100 that a list of request packets is present in the system memory 112 to be processed by the controller 125. The video request channel 602 examines information in the request packets and performs various actions based on the contents of the request packets. Request packets will be described in more detail below. Likewise, the request channels will be described in more detail below.

In one case, the video request channel 602 provides information to the video DMA channel 604, such as address and transfer count information. In response, the video DMA channel 604 performs a transfer of video data from system memory to the video device 122. The video device 122 converts the video data into a video signal which is displayed by the video display 130.

In another case, the video request channel 602 detects that the contents of the request packet is destined for the video device 122 and forwards at least a portion of the request packet to the video device 122. Advantageously, the processor 100 may submit a list of request packets to the controller 125 at one time, rather than submitting a single request to the controller at a time, as will be described in more detail below. The video request channel 602 may fetch a list of request packets, i.e., multiple request packets, at one time and process the list of request packets without intervention by the processor 100. This advantageously reduces the processor 100 request latency and enables the processor to 100 perform other operations while the controller 125 is processing the list of requests. That is, the processor 100 is enabled to make more efficient utilization of its bandwidth.

The video sub-picture request channel 606 and video sub-picture DMA channel 608 function similarly to the video request channel 602 and video DMA channel 604 but perform functions for video sub-picture data to be provided to the video device 122. The video device 122 receives the video sub-picture data and subsequently displays a video sub-picture on the video display 130.

The audio request channel 610 and audio DMA channel 612 function similarly to the video request channel 602 and video DMA channel 604 but perform functions for the audio device 123 rather than the video device 122. The audio device 123 receives the audio data and converts the audio data into an audio signal and provides the audio signal to the speakers 131. The speakers 131 produce sound in response to the audio signal from the audio device 123.

The request channels include buffers (described in more detail with reference to FIG. 6) for temporarily storing portions of the request packets fetched from a request queue (described below with reference to FIG. 4) included in system memory 112. Preferably, the buffers comprise hardware first-in-first-out (FIFO) circuits. The fact that each request channel includes its own buffers enables the request channels to fetch request packets concurrently and independently. Thus, the request channels may each fetch one or more request packets into the buffers and process a next packet as soon as the current packet has completed rather than having to wait a potentially relatively large PCI bus 114 arbitration latency to get the next request packet to process.

The DMA channels also include FIFO buffers for storing the audio and video data transferred from system memory 122. The buffers enable more efficient use of the PCI bus 114 since the data streams may be transferred to the buffers from the system memory 112 in relatively large bursts. The buffers help to minimize the effects of bus arbitration latency on the PCI bus 114. That is, the DMA channels are enabled to arbitrate for the PCI bus 114, burst over chunks of data from the system memory 112, and store the data in the buffers so that the data is available when the device 122/123 is ready for the data. Bursting data in relatively large chunks minimizes the number of bus arbitrations, thereby resulting in more efficient use of the PCI bus 114. Without the buffers, if the DMA channels were to wait to transfer the data from system memory 112 until the device 122/123 were ready for a byte or word of data, the PCI bus 114 arbitration latency may be so long so as to cause the minimum frame or sample time to be exceeded, thereby resulting in distortion in the reproduction of the video or audio. Furthermore, the buffers serve to speed match any disparity in data transfer rates between the devices 122/123 and the PCI bus 114. For example, if one of the devices 122/123 is not able to receive data as fast as the PCI bus interface 620 is able to retrieve the data, then the data may be buffered in the buffers until the device 122/123 is ready to receive the data.

The request channels and DMA channels each comprise state machines which operate independently and concurrently to fetch request packets and to transfer data between system memory 112 and the devices 122/123. The request channels and DMA channels provide control signals to the PCI bus interface 620 to request the interface 620 to perform transfers of request packets and data from the system memory 112.

The request channels are configured such that the processor 100 may submit request packets to the request channels in an asynchronous manner. That is, the processor 100 may request data to be transferred to the devices 122/123 without having to poll status registers in the devices such as would occur in prior art systems. This decoupling of the processor 100 and controller 125 advantageously improves the performance of the system C by enabling the processor 100 and controller 125 and devices 122/123 to operate in a concurrent fashion as described in more detail below. Furthermore, the controller 125 is configured such that data transfers and fetches of request packets from system memory 112 may be performed concurrently thereby minimizing the possibility of data not being supplied to the devices 122/123 at required data rates.

The posted request channel 614 and decompressed audio DMA channel 618 serve to transfer audio data from the audio device 123 to the system memory 112. In one embodiment, the audio device 123 may receive an audio signal from the microphone 131 and convert the audio signal into audio data. The audio data is then transferred by the decompressed audio DMA channel 618 in conjunction with the posted request channel 614 to the system memory 112. In another embodiment, the audio device 123 receives compressed audio data from the system memory via the audio request channel 610 and audio DMA channel 612 and decompresses the compressed audio data. The decompressed audio data is then transferred by decompressed audio DMA channel 618 in conjunction with the posted request channel 614 to the system memory 112. The audio data transferred to the system memory by the decompressed audio DMA channel 618 is referred to as unsolicited data. The request packets used by the posted request channel 614 are referred to as unsolicited request packets, which will be described in more detail below.

When the request channels complete a request packet they provide information, such as request packet address information, to the completion queue 616. In response, the completion queue 616 notifies the processor 100 of the completion of the request packets. Advantageously, the completion queue 616 may complete a list of request packets, i.e., one or more request packets, to the processor 100 as will be described in more detail below. This advantageously enables the processor 100 to service the completion list when possible and reduces the request latency thereby enabling the processor 100 to make more efficient utilization of its bandwidth.

The video interface circuit 624 is configured for coupling to the video device 122 via a video bus 628. In one embodiment (i.e., the embodiment of FIG. 1a), the video bus 628 comprises a YUV bus, as described above. In the embodiment of FIG. 1a, the video interface circuit 624 generates video timing signals, such as horizontal and vertical sync. In one embodiment (i.e., the embodiment of FIG. 1), the video bus 628 comprises a guest bus. The video interface circuit 624 receives video data and video sub-picture data from the video request channel 602 and video sub-picture request channel 606, respectively, in a 32-bit wide data format. The video interface 624 provides the data in a format required by the video device 122, such as an 8-bit wide data format. The video interface 624 works in conjunction with the video request channel 602 and video sub-picture request channel 606 to forward commands and data to the video device 123.

The audio interface circuit 626 is configured for coupling to the audio device 123 via an audio bus 630. In one embodiment, the audio bus 630 comprises an I$^2$S serial bus for interfacing to an audio DAC, as described above. In another embodiment, the audio bus 630 comprises an 8-bit wide guest bus for interfacing to an audio decoder, as described above. The audio interface circuit 626 receives audio data from the audio request channel 606 in a 32-bit wide data format. The audio interface 626 provides the data in a format required by the audio device 123, such as an 8-bit wide data format or a serial I$^2$S data format. The operation of the controller 125 will be described in more detail below.

Figure 2A:
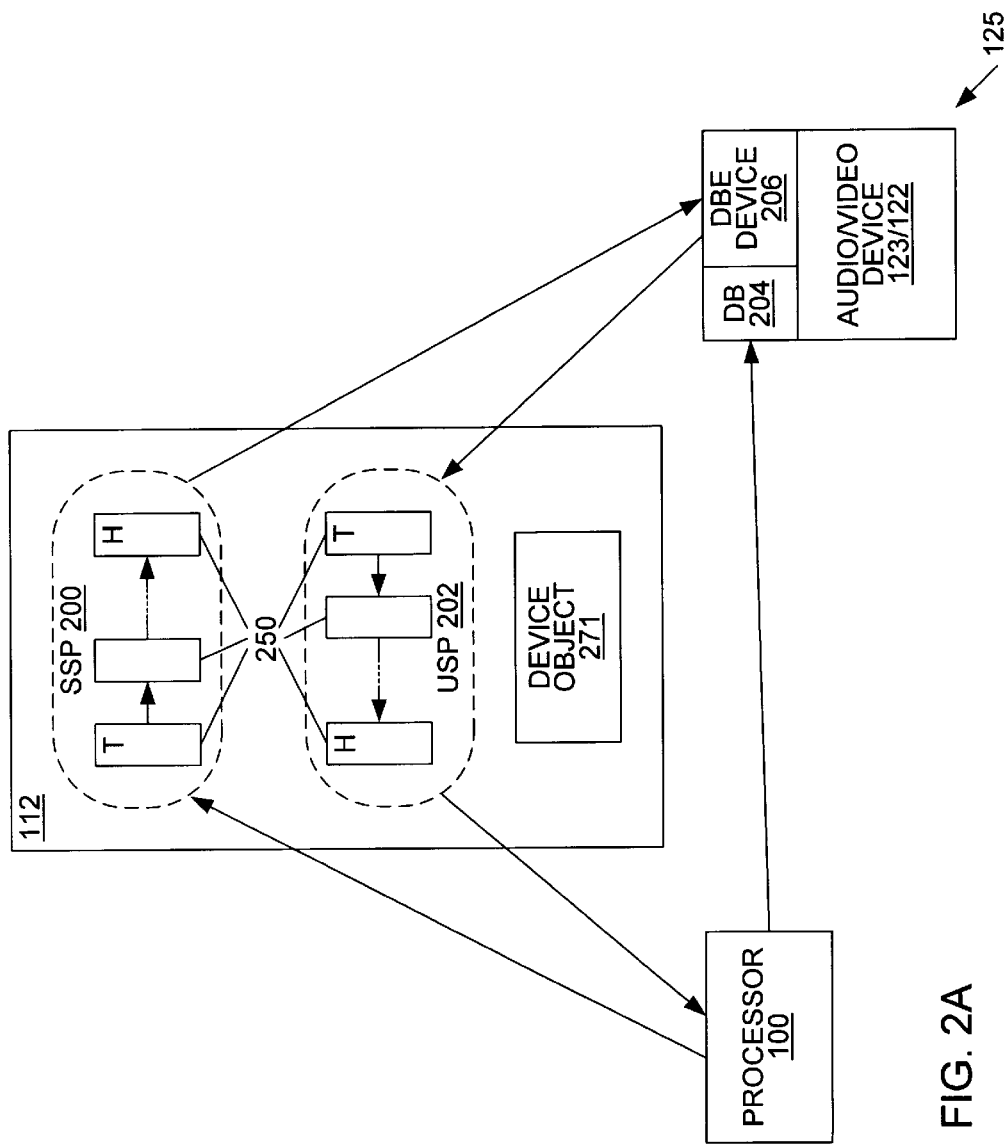
FIG. 2a is flow diagram of the architecture of the system of FIG. 1.
Figure 2B:
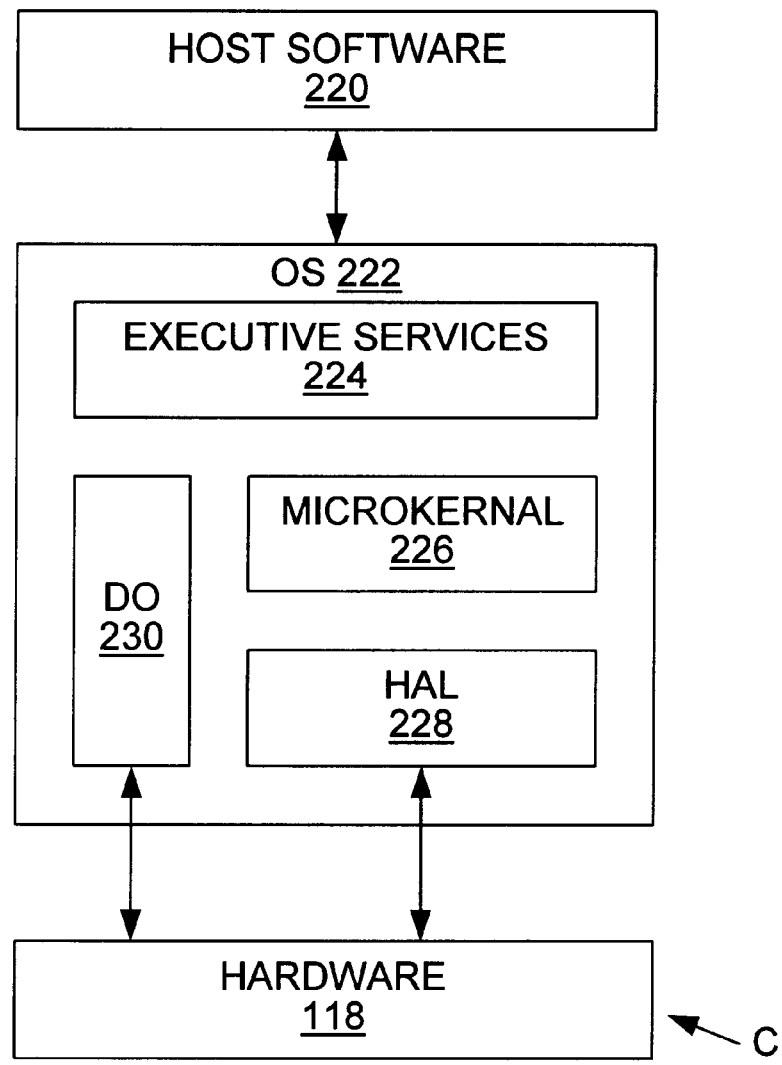
FIG. 2b is block diagram of the software architecture of the system of FIG. 1.

FIGS. 2A and 2B—System Architecture

Reference is directed to the flow diagram of FIG. 2A. Of particular interest to the present application is the way in which the processor 100 communicates with the multimedia controller 125, and vice versa. For the controller 125, there is developed in main memory 112 at initialization time a solicited packet pool 200 and an unsolicited packet pool 202. The area of memory 112 containing the packet pools is shared between the processor 100 and the controller 125. The solicited packet pool 200 contains one or more request packets 250 used by the processor 100 to solicit audio and video data to/from the controller 125. The unsolicited packet pool 202 contains two or more packets 250 used by the controller 125 to communicate unsolicited data to the processor 100, such as the decompressed video data received from the audio device 123. Unsolicited data is data received spontaneously by the controller 125 from an asynchronous data source, such as the microphone 131.

The packets 250 comprising a packet pool are linked at initialization time to form a list. Each list has a head H and tail T packet to which other packets 250 can be linked. Packets 250 residing in the solicited packet pool 200 are preferably the same length and linked together with virtual addresses. Packets 250 residing in the unsolicited packet pool 202 are preferably the same length but are linked together with physical addresses.

To facilitate the movement of packets between memory 112 and the controller 125, the controller 125 preferably includes a distributed burst engine (DBE) 206. The DBE 206 is comprised of the request channels, DMA channels and completion queue 616 of FIG. 1b and additional registers which will be described below. The function of the DBE 206 is to retrieve, complete and send packets 250 without intervention from the processor 100.

The DBE 206 contains doorbell registers 204. Each request channel and the completion queue 616 include a doorbell register. A doorbell 204 is "rung" by the processor 100 to notify a request channel that one or more packets 250 have been prepared and are available in memory 112. Thereafter, the request channels read the packets from memory 112 to process the packets 250 according to their contents. A doorbell 204 is rung by the processor 100 to notify the completion queue 616 that the processor 100 has received the last completion list of request packets and is ready to receive another completion list. Thereafter, the controller 125 may complete another completion list to the host.

If the audio device 123 receives data from an external source, such as the microphone 131, an unsolicited request packet in system memory 112 is prepared by the posted request channel 614. The data is transferred to the unsolicited packet by the decompressed audio channel 618. After the completion queue 616 places the unsolicited packet in memory 112, the processor 100 is interrupted to notify the processor 100 that the unsolicited packet is available for processing.

Therefore, direct communication between the processor 100 and controller 125 is reduced or limited by the command packet architecture. This decoupling of the processor 100 and controller 125 by way of the command packet architecture results in a number of benefits, including: reduced hardware interrupts, greater performance for processor 100 and eliminated processor 100 reads from the controller 125.

Referring now to FIG. 2B, there is illustrated how a device driver for the controller 125 communicates with the system memory 112. In the prior art, the processor 100 would communicate directly with an I/O device through a device driver which would configure memory mapped I/O registers on the I/O device to cause the I/O device to perform an operation. After the operation was completed, the I/O device would interrupt the processor 100 which in turn would cause the processor 100 to check status registers on the I/O device as to the source of the interrupt.

According to the preferred embodiment of the present invention, requests are generated from a host software application 220 to an operating system (OS) 222, such as Windows NT, Windows 95, Windows 3.1 or the UNIX operating system. The OS 222 is generally comprised of a kernel which includes certain executive services 224, a microkernel 226, a hardware abstraction layer (HAL) 228 and an I/O system having one or more device drivers 230. The device drivers 230 are allowed to communicate directly with the computer system hardware C, such as memory 112 and the controller 125. The device driver 230 for the controller 125 is not required to run at any special processor 100 privilege level ("ring" level on an Intel processor). The driver 230 can execute in kernel or user mode.

A device driver 230 herein refers to that class of device drivers well know in the art for operating systems such as Windows, Windows NT, OS/2, UNIX and the like. However, it is understood that a device driver 230 written in accordance with the present invention would not be well known in the art.

The device driver 230 can be viewed as having six primary functions with respect to interacting with the controller 125 and host software 220. These functions are initialization/deinitialization, packet submission, packet completion, synchronized direct access, packet cancellation and increase/decrease packet pools.

The driver 230 must initialize the controller 125 and audio device 123 and video device 122 during system initialization. Once the controller 125 and audio device 123 and video device 122 are initialized and can accept requests, the driver 230 can initiate device requests, i.e., can submit request packets to the controller 125, and the controller 125 can initiate data transfers. The device driver 230 can then perform the appropriate completion sequence for the packets. These details are discussed below.

It is noted that since the device driver 230 preferably executes on the processor 100, the terms can be used interchangeably when referring to packet processing performed by the operating system 222. Additionally, the term "host" is sometimes used to logically refer generally to the processor 100, host software 220 and device driver 230. In such cases, the number designation will be the same as the processor 100, i.e. host 100.

Figure 3:
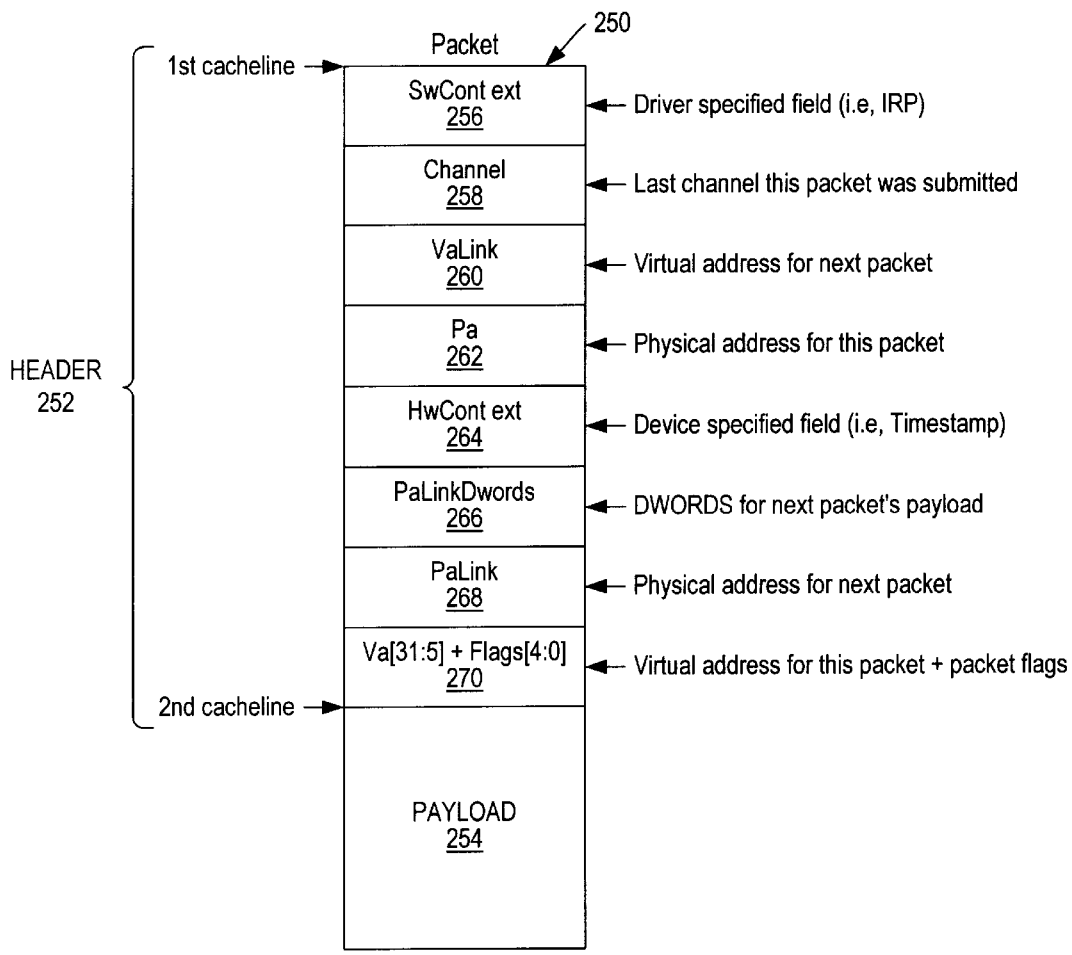
FIG. 3 illustrates a request packet according to the preferred embodiment of the present invention.

FIG. 3—Request Packets

Before proceeding with further detail on the operation of the controller 125, it is necessary to understand more details of a request packet 250. Referring now to FIG. 3, there is illustrated a packet 250 according to the preferred embodiment. The packet 250 is comprised of two main parts: a 32 byte header 252 and a variable size payload 254. Each packet is aligned to a 64 byte boundary, or Pentium cacheline. In this way, the first cacheline contains the header 252 and subsequent cachelines may contain the payload 254. The payload 254 holds the device specific data which can range from 4 to 256 bytes, in 4 byte increments. The data in the payload 254 may include actual video or audio data, commands for the video/audio device 122/123, or a command which is interpreted by the request channel to control the corresponding DMA channel to perform an transfer of video or audio data from the system memory 112 to the video/audio device 122/123.

The header 252 is comprised of eight 32-bit fields, including a software context (SwContext) field 256, a channel field 258, a virtual address link (VaLink) field 260, a physical address (Pa) field 262, a hardware context (HwContext) field 264, a physical address link Dword (PaLinkDwords) field 266, a physical address link (PaLink) field 268 and a virtual address (Va) field 270. The link fields allow linked lists of packets to be developed.

The SwContext field 256 is a 32-bit field reserved for use by host software 220 as desired. Software might use the SwContext field to embed OS specific information associated with the packet 250. An example would be to place the virtual address of an I/O request packet (IRP) received by the device driver from the other portions of the OS 222 associated with the I/O request within the packet 250. This would allow the device driver 230 to directly recover the I/O request packet during I/O completion without having to manage a list of outstanding requests.

The Channel field 258 is a 32-bit field containing the number of the last channel the packet was associated with. In one embodiment, the posted request channel 614 corresponds to channel 0, the video request channel 602 corresponds to channel 1, the video sub-picture request channel 606 corresponds to channel 2, the audio request channel 610 corresponds to channel 3.

The Va field 270, VaLink field 260, Pa field 262 and PaLink field 268 are contained within the packet header 252 to eliminate multiple address translations between physical and virtual memory. Physical memory is memory 112. Pentium and equivalent processors 100 employ a hardware memory management mechanism for making efficient use of physical memory 112. Typically, programs executing on the processor 100 do not directly address physical memory 112, but instead access memory 112 using virtual addresses. By providing both the virtual and physical address fields within each packet 250, the translation need only be performed once when the packets 250 are initialized. This way, the device driver 230 can operate with virtual addresses and the controller 125 can operate with physical addresses, each communicating with the same packets 250.

The Va field 270 is a 32-bit field comprised of the following fields:

| Bit | Description |
|---|---|
| 31:6 | Contains a virtual address for this packet as viewed by the device driver 230. |
| 5 | Reserved |
| 4 | 0 - Process packet<br>1 - Cancel packet |

-continued

| Bit | Description |
|---|---|
| | Cancellation bit. Represents the processing state of the packet. The device driver sets this bit to indicate to the controller 125 that the packet 250 should not be processed and should be completed immediately. |
| 3 | 0 - Normal submission<br>1 - Begin Direct Access<br>Direct access bit. Indicates to the controller 125 that the driver 230 will perforrn a direct access after completion of this packet. When received, the controller 125 will not pull any more data until direct access is ended. If "1", this packet is completed immediately. |
| 2:1 | 00 - Null submission state<br>01 - Asynchronous packet<br>10 - Polled packet<br>11 - Interrupt packet<br>Submission type bits. Contains the value representing how this packet was submitted to the controller 125. A packet in the unsolicited pool will have all zeros in this field. |
| 0 | 0 - Unsolicited packet pool<br>1 - Solicited packet pool<br>Packet Type bit. Indicates which pool the packet belongs to. |

The VaLink field is a 32-bit field containing a virtual address of the next packet in a list. The field is null if there are no packets linked. This field is used by the controller 125 to link free packets back on the solicited packet pool 200 when completed by the controller 125. Free packets are packets that have been completed and are now "free" to use again. Although the controller 125 does not necessarily comprehend virtual addressing, it can link packets 250 with virtual addresses by simply reading and writing the virtual addresses contained in the packets 250.

The Pa field 262 is a 32-bit field containing the physical address of the packet 250. This is the address seen and used by the controller 125. The PaLink field 268 is a 32-bit field containing the physical address of the next packet 250 in a list. The HwContext field 264 is a 32-bit field is may be used to communicate hardware specific information. For example, a timestamp which is recognizable by the controller 125 hardware may be placed in the HwContext field by system software. The PaLinkDwords field 266 is a 32-bit field containing the size of the next packet's payload 254. The size is preferably expressed as a number of consecutive 4-byte chunks.

Thus, a packet structure and protocol is defined which allows the device driver 230 to communicate packets with the audio device 122 and video device 123 and controller 125. Upon device initialization, the processor 100 allocates a particular number of packets for each device. The device driver 230 then communicates with the audio/video device 122/123 by writing commands and data into packets 250 stored in memory 112 and notifying the corresponding request channel of the controller 125, via the doorbell 204, that a packet 250 is ready to be processed. The request channel reads the packet 250 from memory 112 and parses it to determine what operation was requested by the driver 230. Depending on how the packet 250 was issued to the request channel determines how the request channel will complete the operation and return the packet 250 to memory 112 for the driver 230.

Packets 250 can be submitted in one of three ways as indicated in the Va field 270: asynchronous, polled or interrupt. The device driver 230 submits asynchronous packets when completion notification is not required or desired. Typically, the audio and video data transfer operations to the audio/video device 122/123 are submitted as asynchronous request packets. This is because the processor 100 does not need or want to know whether or not the data was successfully provided to the audio/video device 122/123. The device driver 230 submits interrupt packets when it requires completion notification by means of a hardware interrupt asserted by the controller 125.

The device driver 230 submits polled packets for those situation where the host software 220 requires polling. In certain cases, polled packets provide a more efficient means of completion notification. Hence, the controller 125 provides a way for the device driver 230 to submit a request to the audio/video device 122/123 and poll on the packet 250 until the audio/video device 122/123 finishes the request. Advantageously, the processor 100 polls a location in memory 112, rather than a location on the PCI bus 114. Preferably, the processor 100 includes an internal and/or external cache, wherein the initial poll of the memory location accesses the memory 112 and subsequent polls access the cache.

Figure 4:
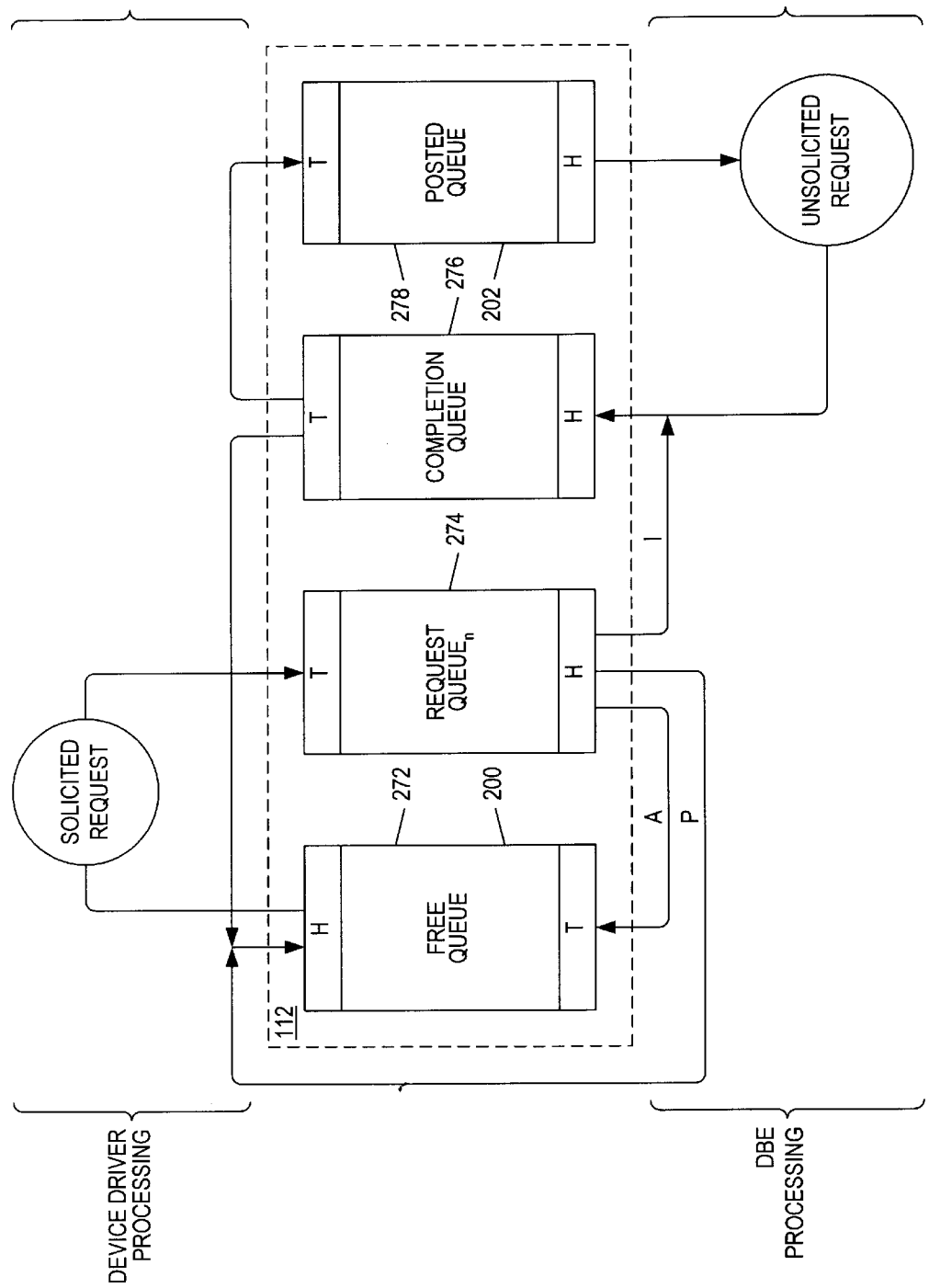
FIG. 4 is a block diagram illustrating request packet queues included in system memory which facilitate communication between the processor and the controller of FIG. 1.

FIG. 4—Packet Queues

Upon initialization, the device driver 230 forms the solicited packet pool 200 and unsolicited packet pool 202. Referring now to FIG. 4, there is illustrated further detail regarding the formation of these linked lists of packets. In order to manage the flow of packets both between the device driver 230 and memory 112, and the controller 125 and memory 112 there are four queues 272–278 formed: a free queue (FQ) 272, a request queue (RQ) 274, a completion queue (CQ) 276 and a posted queue (PQ) 278. The free queue 272 corresponds to the solicited packet pool 200 and the posted queue 278 corresponds to the unsolicited packet pool 202. Each of these four queues 272–278 have a head H and tail T packet. Preferably, the request queue 274 comprises three separate request queues, one for each of the video request channel 602, video sub-picture request channel 606, and audio request channel 610.

The device driver 230 maintains the head H of the free queue 272 and the tail T of the remaining three queues 274–278. The controller 125 maintains the tail T of the free queue 272 and the head H of the remaining three queues 274–278.

The free queue 272 contains packets 250 which are available for the device driver 230 to use for communication with the audio/video device 122/123. As requests are solicited from host software 220, the device driver 230 unlinks packets 250 from the head H of the free queue 272, fills in the packet's payload 254 and links the packets 250 to the tail T of the request queue 272. Packets 250 may be submitted either asynchronously (A), polled (P) or interrupt (I).

The request channels of the controller 125 process solicited requests by unlinking the packets 250 from their respective request queue 274, performing the commands in the payload, and completing the packets 250 according to their submission method. More specifically, asynchronous packets A are completed to the tail T of the free queue 272 without notification to the device driver 230. Polled packets P are returned to the head H of the free queue 272 by the device driver 230 and interrupt packets I are completed through the completion queue 276.

For interrupt packets, after the controller 125 has linked an interrupt packet I to the head H of the completion queue 276, a hardware interrupt to the processor 100 may be generated. If the completion queue 276 is empty, the controller 125 places the list of completed packets at the head H of the completion queue 276 and generates an interrupt to the processor 100. If the completion queue 276 is not empty, the controller 125 links completed request packets but waits to place the list of completed request packets in the completion queue 276 until the processor 100 notifies the controller 125 via the doorbell 204 that the processor 100 is ready to receive a completion list. In response to the interrupt, the device driver 230 unlinks packets 250 from the completion queue 276, removes the payload 254 in the case of an unsolicited packet, and returns the packets to either the free queue 272 or the posted queue 278 based on bit 0 of the Va field 270.

The posted queue 278 holds packets 250 for unsolicited requests. When an unsolicited request is generated, the posted request queue 614 unlinks a packet 250 from the posted queue 278, the decompressed audio DMA channel 618 fills the payload 254 with data, and the completion queue 616 links the packet 250 to the completion queue 276 as described above.

As mentioned above, preferably each of the request channels include buffers for buffering a portion of the corresponding queue in system memory 112. That is, the video request channel 602 includes a buffer for buffering a portion of the video request channel request queue 274; the video sub-picture request channel 606 includes a buffer for buffering a portion of the video sub-picture request channel request queue 274; the audio request channel 610 includes a buffer for buffering a portion of the audio request channel request queue 274; the posted request channel 616 includes a buffer for buffering a portion of the posted queue 278; and the completion queue 616 includes a buffer for buffering a portion of the completion queue 276.

Software Interface to DBE

Preferably, the DBE device 206 of the controller 125 is abstracted to the device driver 230 through a DBE device object 271 (of FIG. 2A). The DBE device object 271 contains the relevant data structures and resources required to manage the packet protocol between the driver 230 and DBE device 206. The DBE device object 271 is stored in memory 112 and managed by the device driver 230.

The DBE device object 271 is created and used by the device driver 230 to manage the target controller 125 resources. The DBE device object 271 is aligned to a Pentium cache line boundary to reduce the number of cache line fills on frequently referenced adjacent data items. The DBE device object 271 is comprised of the data structure listed in the table below.

| Parameter | Description |
| --- | --- |
| DeviceID | A 32-byte field used as the controller 125 unique device ID. |
| FreeQueue | A 32-byte memory location containing fields to manage the free queue 272, including the address for the head packet. |
| CompletionQueue | A 32-byte memory location containing fields to manage the completion queue 276, including the address for the tail packet. |
| RequestQueue | A 32-byte memory location containing fields to manage the request queue 274, including the address for the tail packet. Preferably, the RequestQueue field comprises three fields, one for each of the request channels. |
| PostedQueue | A 32-byte memory location containing fields to manage the posted queue 278, including the address for the tail packet. |
| RegistersVa | A 32-byte memory location containing fields to hold the virtual addresses of the DBE device 206 registers. |
| RegistersPa | A 32-byte memory location containing fields to hold the physical addresses of the DBE device 206 registers. |
| MmioAddressRange | A 32-bit memory location containing the |

-continued

| Parameter | Description |
|---|---|
| | range in bytes required to map the DBE device 206 registers. |
| RequestPacketCount | A 32-bit memory location containing the number of packets allocated to the solicited packet pool. |
| RequesPacketSize | A 32-bit memory location containing the Dword size of the Payload field for each packet of the solicited packet pool. |
| PostedPacketCount | A 32-bit memory location containing the number of packets allocated to the unsolicited packet pool. |
| PostedPacketSize | A 32-bit memory location containing the Dword size of the Payload field for each packet of the unsolicited packet pool. |
| DbeFlink | A 32-bit memory location containing a pointer to the a DBE device object in front ofthis one. |
| DbeBlink | A 32-bit memory location containing a pointer to the a DBE device object in back ofthis one. |
| DummyPacket | This field points to a dummy command packet used by the device driver 230 to ensure a packet on the tail of the request queue does not reference itself. This condition can occur if the last submitted packet is returned to the free queue before another packet gets allocated and submitted to the controller 125. An allocate packet routine checks for this condition before returning the packet address to the caller. If the packet removed from the free queue happens to be the last packet submitted to the DBE device 206, the allocate packet routine swaps the removed packet address with the DummyPacket address. |

Figure 5:
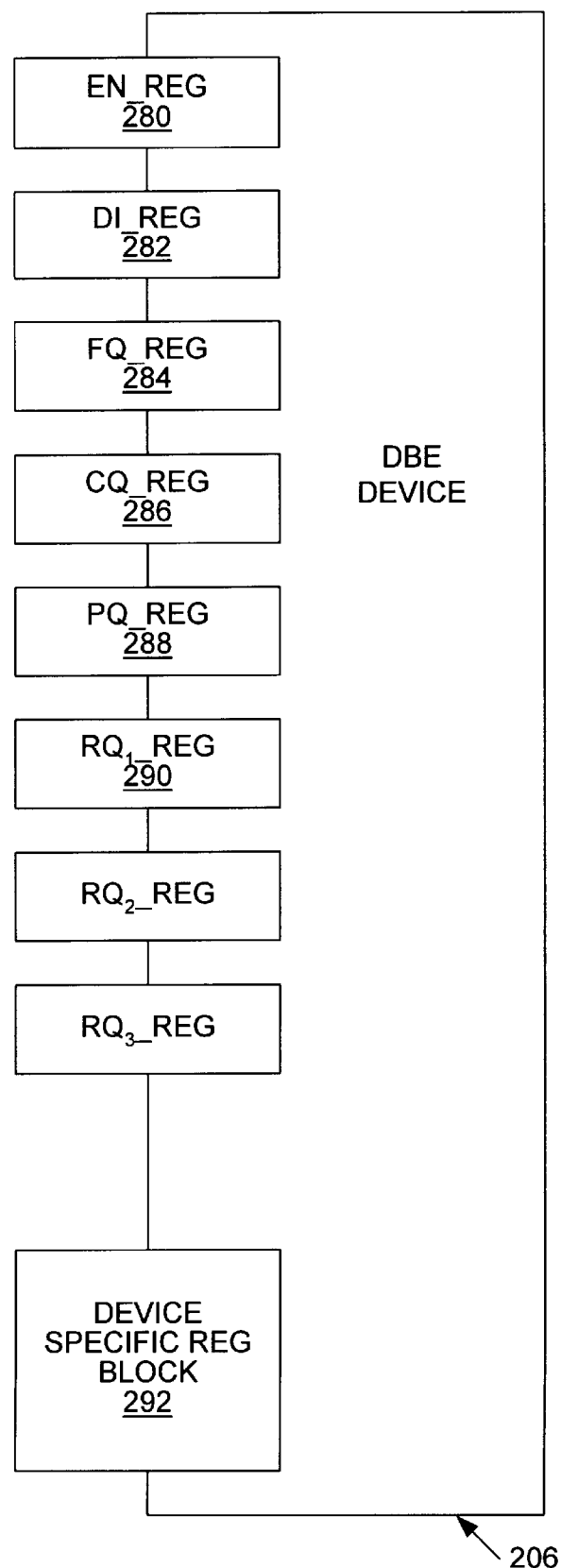
FIG. 5 is a block diagram of a register interface of the controller of FIG. 1b.

FIG. 5—DBE Device Interface

Referring now to the DBE device 206, attention is directed to FIG. 5 where there is illustrated a register interface of the DBE device 206. The DBE device 206 includes a set of memory mapped I/O registers 280–292 to facilitate the DBE protocol. The device driver 230 corresponding to the DBE device 206 writes configuration information to the registers 280–292 during system initialization. The registers 280–292 are accessible to both the processor 100 (device driver) and the DBE device 206. The registers include an event enable register (EN_REG) 280, an event disable register (DI_REG) 282, a free queue tail register (FQ_REG) 284, a completion queue head register (CQ_REG) 286, a posted buffer queue head register (PQ_REG) 288 and three request queue head registers (RQ$_1$_REG, RQ$_2$_REG and RQ$_3$_REG) referred to collectively as 290.

The event enable register (EN_REG) 280 is a 32-bit register for containing implementation specific information. Bits 31:2 are available for customization. Bits 1:0 are defined below. This register has the attributes of being a 32 bit, read/write, bit mapped and memory mapped I/O register. The bit definitions are as follows:

| | EN_REG | |
|---|---|---|
| Bit | Processor cycle | Description |
| 0 | W | 0 - no affect on this bit |
| | | 1 - places the DBE device into RESET |
| 0 | R | 0 - DBE device is not in RESET |
| | | 1 - DBE device is in RESET |
| 1 | W | 0 - No affect on this bit |
| | | 1 - Enables the DBE device interrupt to the host processor |
| 1 | R | 0 - DBE device interrupt is not enabled |

| | EN_REG | |
|---|---|---|
| Bit | Processor cycle | Description |
| 31:2 | R/W | 1 - DBE device interrupt is enabled these bits are defined for custom use |

The event disable register (DI_REG) 282 is used by the device driver 230 to disable the events enabled by the EN_REG 280. The EN_REG 280 and DI_REG 282 registers are implemented to eliminate read/modify/write operations normally required to atomically affect the individual bit positions for set/clear operations to the same register. This register has the attributes of being a 32 bit, read/write, bit mapped and memory mapped I/O register. The bit definitions are as follows:

| | DI_REG | |
|---|---|---|
| Bit | Processor cycle | Description |
| 0 | W | 0 - no affect on this bit |
| | | 1 - Takes the DBE Device out of RESET |
| 0 | R | 0 - DBE Device is still in RESET |
| | | 1 - DBE Device is out of RESET |
| 1 | W | 0 - No affect on this bit |
| | | 1 - Disables the DBB Device Interrupt to the host processor |
| 1 | R | 0 - DBE Device inteirupt is enabled |
| | | 1 - DBE Device interrupt is disabled |
| 31:2 | R/W | these bits are defined for custom use |

The free queue tail register (FQ_REG) 284 is a 32-bit register for storing the physical address of the last packet 250, or tail packet T, on the solicited packet pool 200. The register is initialized by the device driver 230 during system initialization. Thereafter, the register is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's."

The DBE device 206 completes asynchronous packets (discussed below) to the tail T of the solicited packet pool 200 without sending notification back to the device driver 230. The device driver 230 should keep at least one free packet 250 on the solicited packet pool 200 for the DBE device 206 to have a place to link completed asynchronous packets 250. This register has the attributes of being a 32 bit, read/write, bit mapped and memory mapped I/O register. The bit definitions are as follows:

| | FQ_REG | |
|---|---|---|
| Bit | Processor cycle | Description |
| 31:5 | W | Pentium cacheline aligned physical address of the packet on the tail of the solicited packet pool. Writes are only latched by the DBE device in RESET mode |
| 4:0 | W | Always ignored by the DBE device |
| 31:0 | R | Yields the physical address of the last packet on the solicited packet pool |

The completion queue register (CQ_REG) 286 is a 32-bit register for storing the physical address of a completion list head located in memory 112. That is, the physical address contained in the CQ_REG 286 is the location in memory 112 where the DBE device 206 places a completion list of completed request packets. The CQ_REG 286 is initialized by the device driver 230 with the 4-byte aligned physical address of the location to place the head of a completion list built by the DBE device 206. Thereafter, the CQ_REG 286 is maintained by the DBE device 206. To implement this procedure, the DBE device 206 latches processor 100 writes to bits [31:2] of this register when the DBE device 206 is in RESET mode (EN_REG[0]="1"). The DBE device 206 assumes bits [1:0] of the physical address contain "0's."

CQ_REG

| Bit | Processor cycle | Description |
| --- | --- | --- |
| 31:2 | W | DWORD aligned physical address of the Completion queue head. Writes are only latched by the DBE device in RESET mode |
| 1 | W | 0 - Always ignored by the DBE device |
| 0 | W | 0 - No affect on this bit position<br>1 - Sets the CQ doorbell ONLY when DBE device is out of RESET mode |
| 31:0 | R | Yields the current contents of this register |

The posted queue register (PQ_REG) 288 is a 32-bit register for storing the 32-byte aligned physical address of the first packet 250 in the unsolicited packet pool 202. The PQ_REG 288 is initialized by the device driver 230 during system initialization. Thereafter, the PQ_REG 288 is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's." The DBE device 206 reads this register to determine where to write unsolicited data into memory 112.

PQ_REG

| Bit | Processor cycle | Description |
| --- | --- | --- |
| 31:5 | W | Pentium cacheline aligned physical address of the first packet in the unsolicited packet pool. Writes are only latched by the DBE device in RESET mode |
| 4:1 | W | 0000 - Always ignored by the DBE device |
| 0 | W | 0 - No affect on this bit position<br>1 - Sets the PQ doorbell ONLY when DBE device is out of RESET mode |
| 31:0 | R | Yields the current contents of this register |

Preferably, the video request queue head register $RQ_1$_REG corresponds to the video request channel 602, the video sub-picture request queue head register $RQ_2$_REG corresponds to the video sub-picture request channel 606, and the audio request queue head register $RQ_3$_REG corresponds to the audio request channel 610. The request queue head registers ($RQ_n$_REG) 290 are 32-bit registers for storing the 32-byte aligned physical address of where the next request packet 250 has been placed by the device driver 230. Each $RQ_n$_REG 290 is initialized by the device driver 230 during system initialization with the physical address of a "dummy" packet 250 corresponding to request channels. Thereafter, the $RQ_n$_REG 290 is maintained by the DBE device 206. To implement this procedure, the DBE device 206 latches processor 100 writes to bits [31:5] of this register when the DBE device 206 is in RESET mode (EN_REG[0]="1"). The DBE device 206 assumes bits [4:0] of the physical address contain "0's." The DBE device 206 uses this register to fetch packets 250.

$RQ_n$_REG

| Bit | Processor cycle | Description |
| --- | --- | --- |
| 31:5 | W | Pentium cacheline aligned physical address of the "Dummy" packet for request channel$_n$. Writes are latched by the DBE device in RESET mode |
| 31:5 | R | Yields bits [31:5] of the physical address of the last request packet processed by the DBE device |
| 4:2 | W | 0000 - Always ignored by the DBE device |
| 4:2 | R | Always returns 000 |
| 1 | W | 0 - No affect on this bit<br>1 - Ends synchronized direct access for request channel$_n$ at the DBE device only when DBE device is out of RESET mode |
| 1 | R | 0 - Channel$_n$ is synchronized for direct access<br>1 - Channel$_n$ is processing packets |
| 0 | W | RQ_DOORBELL<br>0 - No affect on this bit position<br>1 - Sets the $RQ_n$ doorbell only when device is out of RESET mode |
| 0 | R | RQ_DOORBELL<br>0 - Doorbell event cleared by the DBE device<br>1 - Doorbell event pending at the DBB device |

Figure 6:
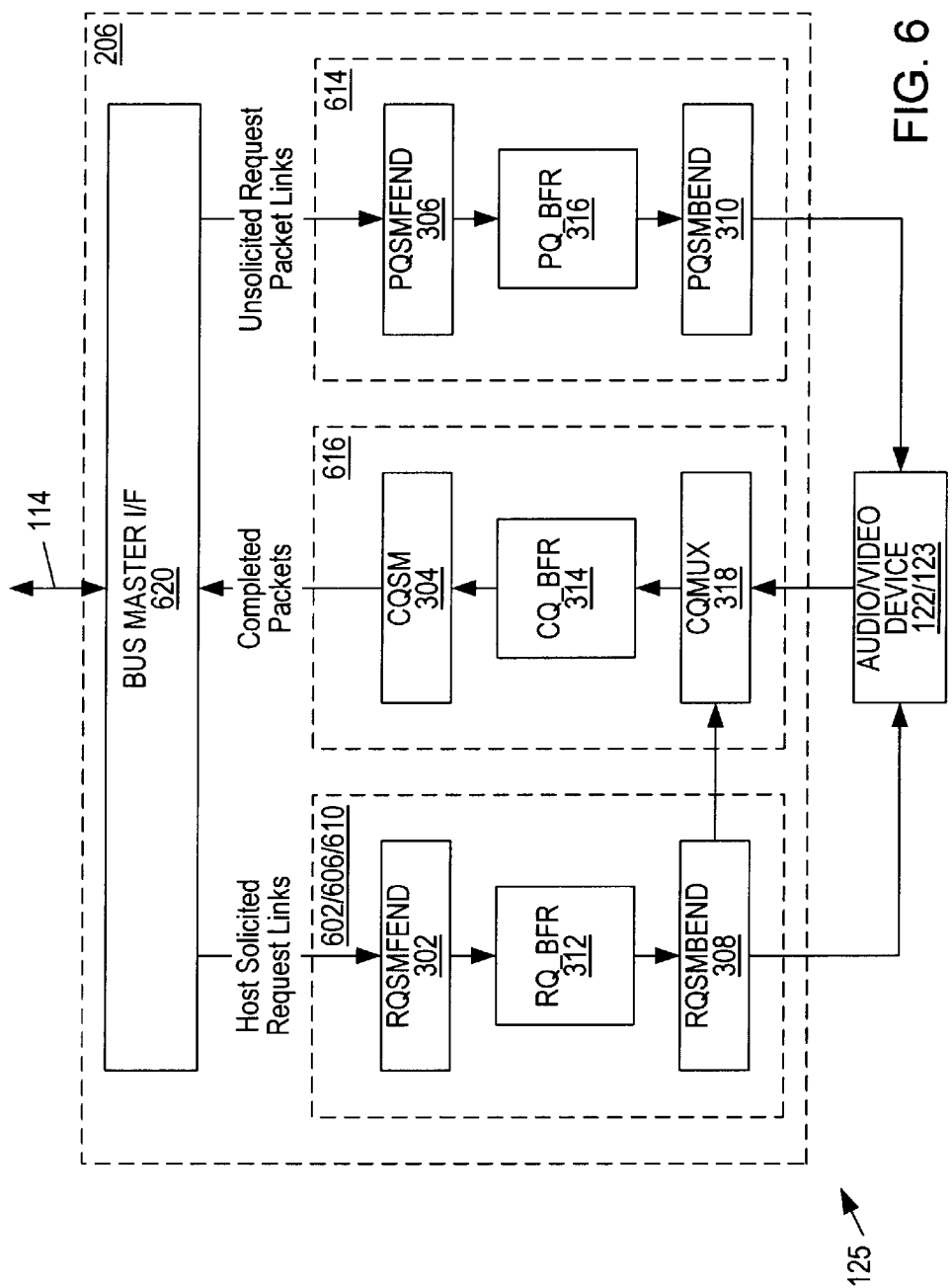
FIG. 6 is a block diagram illustrating portions of the controller of FIG. 1b in greater detail.

FIG. 6—Distributed Burst Engine (DBE)

Referring now to FIG. 6, there is illustrated a block diagram of the controller 125 including the DBE device 206. The DBE device 206 includes a PCI bus master interface (I/F) 620 for exchanging data packets 250 over the PCI bus 114 between the DBE device 206 and memory 112. Alternatively, the DBE device 206 could have a bus master interface for an EISA bus or any other desired bus.

The DBE device 206 also includes three buffers 312–316 coupled between certain front end state machines 302–306 and certain back end state machines 308–310. The three buffers are a request queue buffer ($RQ_n$_BFR) 312, a completion queue buffer (CQ_BFR) 314 and a posted queue buffer (PQ_BFR) 316.

The request queue front end state machine 302, the request queue buffer 312 and the request queue back end state machine 308 comprise a request channel representative of the video request channel 602, the video sub-picture request channel 606 and the audio request channel 610. Although FIG. 6 shows only a single request channel, it is understood that the controller 125 includes three request channels 602, 606 and 610 as shown in FIG. 1b. That is, each request channel includes its own front end and back end state machines 302 and 308 and request queue buffer 312.

The posted queue front end state machine 306, the posted queue buffer 316 and the posted queue back end state machine 310 comprise the posted request channel 614 of FIG. 1b. The completion queue state machine 304, completion queue buffer 314 and completion queue multiplexor 318 comprise the completion queue 616 of FIG. 1b.

The object of the front end state machines is to keep the request queue buffer 312 and posted queue buffer 316 full, and the completion queue buffer 314 empty. The objective of the back end state machines is to pull the packet address and data information from the request queue buffer 312 and posted queue buffer 316, process the packet, and complete the packet back to the processor 100.

The request queue buffer 312 is a first-in-first-out (FIFO) buffer for queuing solicited requests. The completion queue buffer 314 is a FIFO for queuing completed packets. The posted queue buffer 316 is a FIFO for queuing unsolicited requests. The buffers 312–316 are considered to be a subset of their respective queues 274–278 since the buffers 312–316 may only contain a portion of an entire queue's data (queues 274–278). The buffers 312–316 decouple the devices 122/123 from the PCI bus 114 latencies which typically occur as a result of bus arbitration. This results in a higher performance I/O than obtainable before.

The front end state machines include a request queue front end state machine (RQSMFEND) 302, a posted queue front end state machine (PQSMFEND) 306 and a completion queue front end state machine (CQSM) 304. The request queue front end state machine 302 is responsible for processing packets 250 placed on the request queue 274 by the device driver 230 and feeding the request queue buffer 312. The posted queue front end state machine 306 is responsible for pulling posted packet addresses from memory 112 and placing them in the posted queue buffer 316.

The back end state machines 308–310 include a request queue back end state machine (RQSMBEND) 308 and a posted queue back end state machine (PQSMBEND) 310. The request queue back end state machine 308 is responsible for pulling packet information from the request queue buffer 312 and feeding it to the devices 122/123. The posted queue back end state machine 310 is responsible for pulling unsolicited packet addresses from the posted queue buffer 316 and presenting them to the devices 122/123.

The completion queue state machine (CQSM) 304 cooperates with the front end and back end to complete packets and is responsible for maintaining the completion queue 276 and free queue 272 links. Also included in the DBE device 206 is a completion queue multiplexor (CQMUX) 318 for directing the flow of data into the completion queue buffer 314 from multiple sources: the devices 122/123, the request queue back end state machine 308 and the posted queue back end state machine 310. Preferably, the completion queue multiplexor 318 is controlled by the posted queue back end state machine 310.

Figure 7:
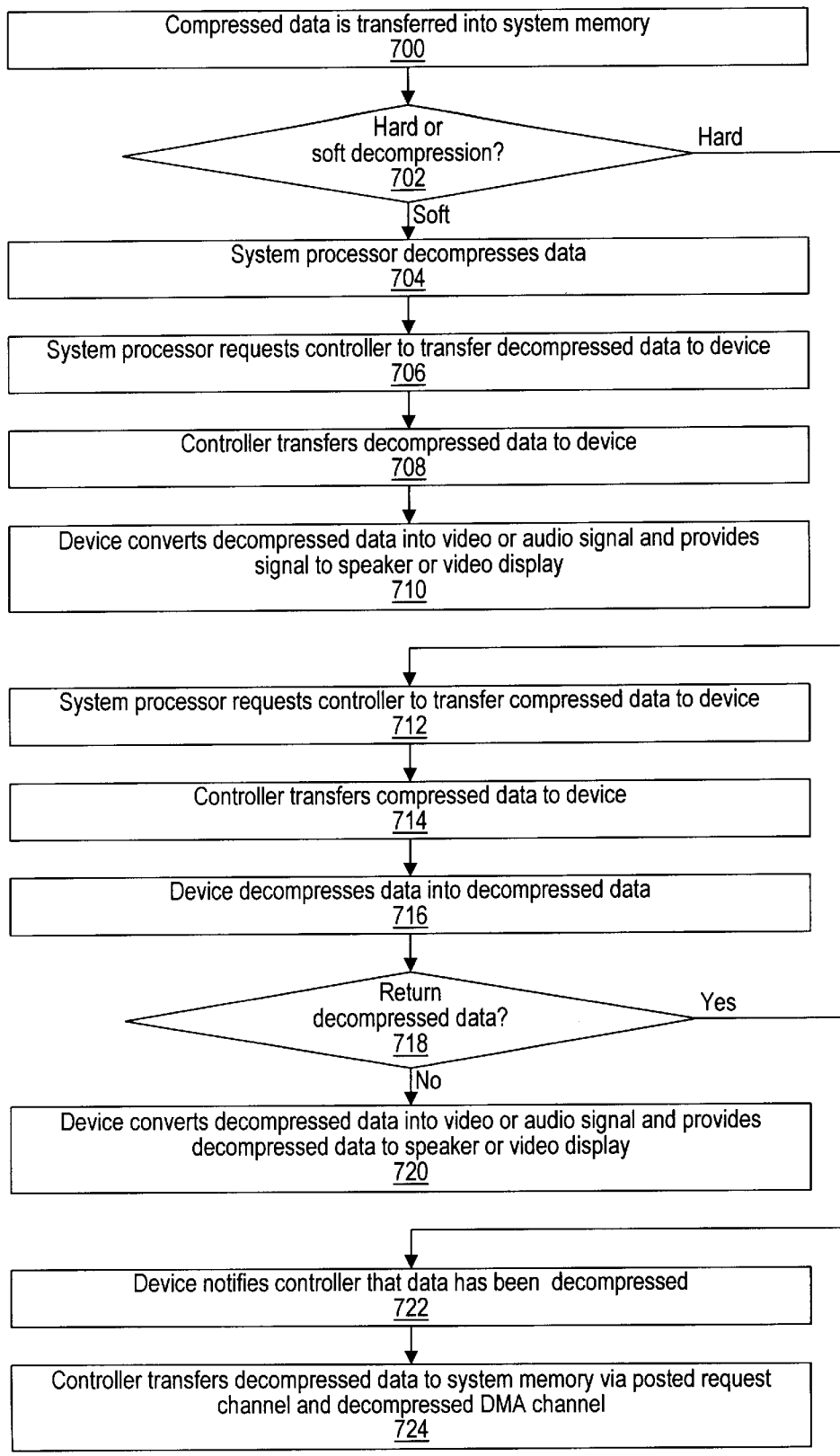
FIG. 7 is a flowchart illustrating operation of the multimedia system of FIG. 1 in performing decompression of compressed audio or video data.

FIG. 7—Hardware/Software Decompression Flowchart

Referring now to FIG. 7, a flowchart illustrating operation of the multimedia system C in performing decompression of compressed audio or video data is shown. In step 700, compressed data, in particular audio or video data, is transferred into system memory 112. The compressed data may have been stored in a file on a permanent storage medium of the computer C such as hard disk 144, hard disk 113, CDROM 111 and/or DVD drive 109, and transferred to the system memory 112 at the request of the processor 100. The compressed data may have been received by the computer C via a network and transferred to the system memory 112 by the network controller 128.

The processor 100 determines whether or not the data should be decompressed using a "hard" or "soft" decompression method, in step 702. "Hard" decompression is defined herein as data decompression performed by an I/O device with dedicated hardware, such as a digital signal processor (DSP) or other hardware, for decompressing compressed data. In a first embodiment, the video device 122 and/or audio device 123, are operable to perform "hard" data decompression. "Soft" decompression is defined herein as decompression performed by a general purpose processor, such as processor 100 of the computer system C. In a second embodiment, the video device 122 and/or audio device 123, are not operable to perform "hard" data decompression. Thus, in the first and second embodiment, the determination of step 702 is essentially made according to the hardware configuration of system C. Therefore, the processor 100 performs the decompression in the second embodiment. In a third embodiment, the video device 122 and/or audio device 123, are operable to perform "hard" data decompression, however, the processor 100 dynamically makes the determination of 702 whether or not to perform hard or soft decompression. In this third embodiment, preferably the determination is dynamically made depending upon the relative amounts of available bandwidth of the processor 100 and device 122/123. That is, if the processor 100 has more available bandwidth during a given time period, the processor 100 may decide to perform soft decompression rather than allowing the device 122/123 to perform hard decompression.

If the processor 100 determines that soft decompression is to be performed, the processor 100 decompresses the data, in step 704. In one embodiment, the processor 100 includes instructions in its instruction set which are advantageous for performing multimedia-related operations, such as data decompression. In this embodiment, the soft decompression is performed at least in part by the execution of the multimedia instructions. In one embodiment, the multimedia instructions include MMX® instructions.

After decompressing the data, the processor 100 requests the controller 125 to transfer the decompressed data from system memory 112 to the device 122/123, in step 706. In response, the controller 125 transfers the decompressed data from the system memory 112 to the device 122/123, in step 708. The device 122/123 then converts the decompressed data into a video or audio signal, such as an analog or digital signal, and provides the video signal to the video display 130 or the audio signal to the speaker 131, in step 710.

If the processor 100 determines that hard decompression is to be performed, the processor 100 requests the controller 125 to transfer the compressed data from system memory 112 to the device 122/123, in step 712. In response, the controller 125 transfers the compressed data from the system memory 112 to the device 122/123, in step 714. The device 122/123 decompresses the compressed data, in step 716.

In step 718, a determination is made as to whether the decompressed data is to be returned to the system memory 112 or not. That is, in one embodiment, the audio device 123 may be used as a decompression engine for decompressing compressed audio data. Other processing steps may be performed on the decompressed audio data, such as audio mixing. Thus, it is desired that the decompressed data be returned to the system memory 112. However, it may be desired that the decompressed data be played/displayed on the speakers 131/video display 130.

If a determination is made that the decompressed data not be returned, the device 122/123 then converts the decompressed data into a video or audio signal, such as an analog or digital signal, and provides the video signal to the video display 130 or the audio signal to the speaker 131, in step 720.

If a determination is made that the decompressed data be returned, the device 122/123 notifies the controller 125 once the data has been decompressed, in step 722. In response, the controller 125 transfers the decompressed data to system memory 112 via the posted request channel 614 and the decompressed audio DMA channel 618 using unsolicited request packets, in step 724, as described above.

FIG. 8—Concurrent Request Packet Submission Flowchart

Figure 8A:
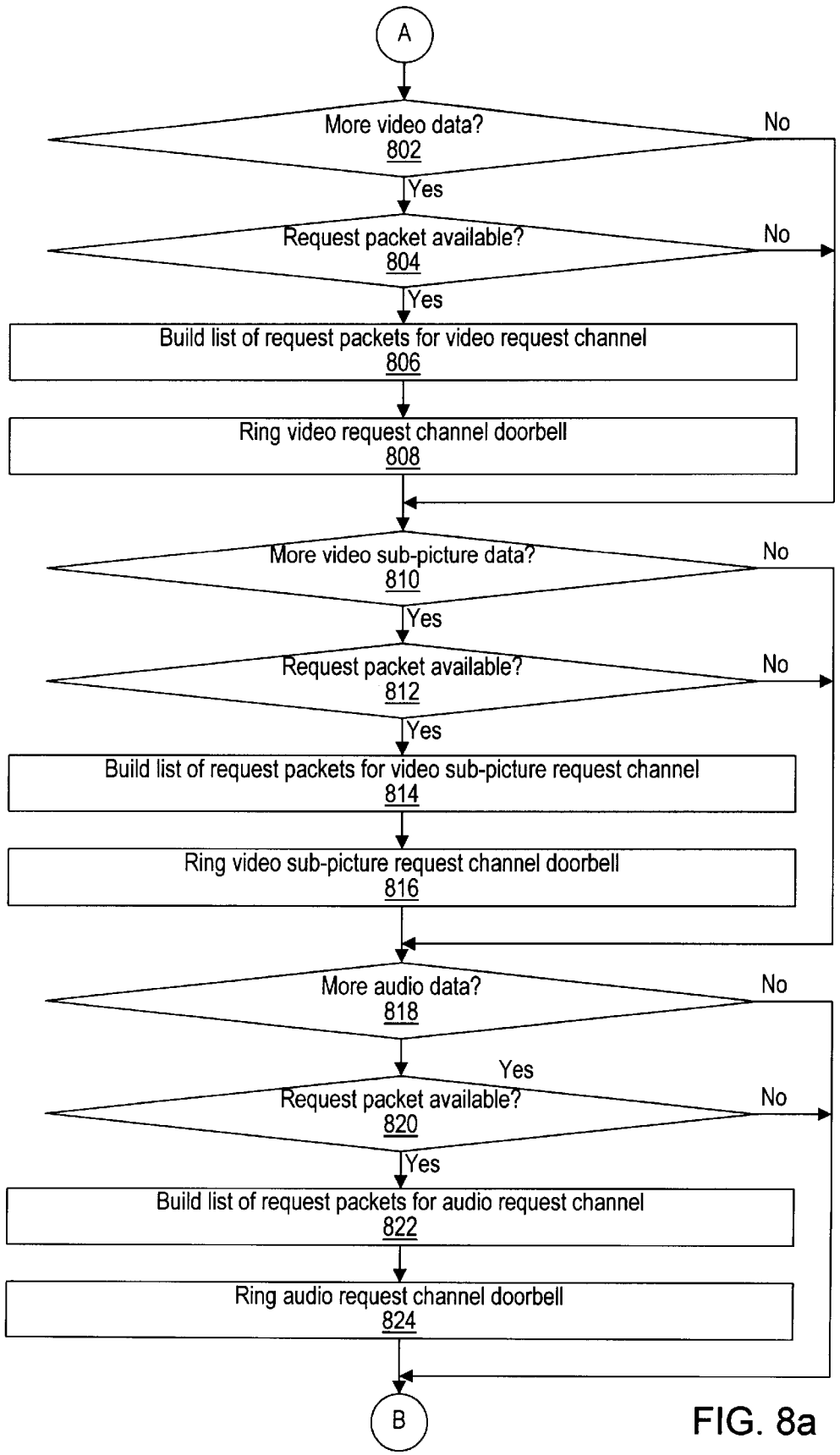
FIGS. 8a and 8b are flowcharts illustrating operation of the processor of FIG. 1 submitting request packets to the controller of FIG. 1b in a concurrent manner.
Figure 8B:
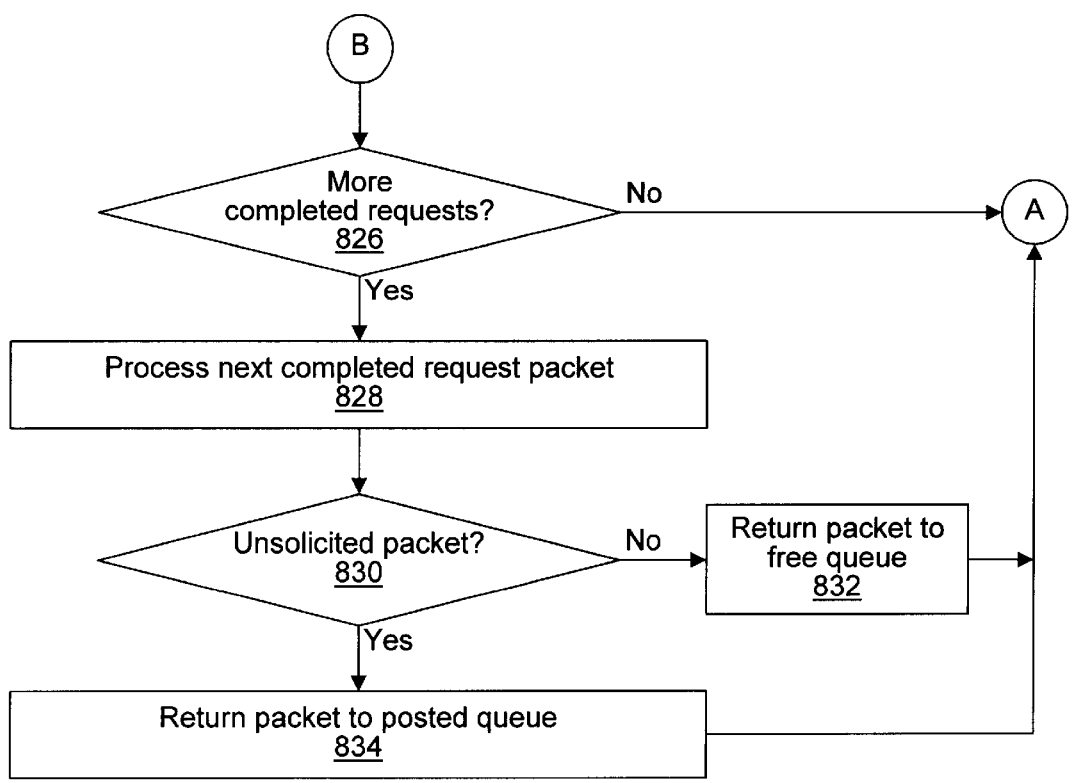

Referring now to FIGS. 8*a* and 8*b* (referred to collectively as FIG. 8), a flowchart illustrating operation of the processor 100 submitting request packets to the controller 125 in a concurrent manner is shown. The steps shown in FIG. 8 may be performed by one or more different threads of execution including one or more applications of the host software 220 and/or the device driver 230 executing on the processor 100. The host software 220 and device driver 230 may execute either in a multitasking operating system, such as Windows NT, or in other operating systems.

Preferably, the processor 100 determines whether or not more video data is to be sent to the video device 122, in step 802. If more video data is to be sent, the processor 100 determines if a request packet is available from the solicited packet pool 200, in step 804. Preferably, the processor 100 executes a function call to the device driver 230 to request a free request packet from the solicited packet pool 200. If the processor 100 obtains a free request packet, the processor 100 populates the request packet with the appropriate information, as described above. The processor 100 then adds the populated request packet to a list of request packets to be submitted to the request queue 274 associated with the video request channel 602, in step 806. The processor 100 then rings the video request channel 602 doorbell 204 by writing a "1" to bit 0 of the $RQ_1\_REG$, in step 808. The video request channel detects the ringing of the doorbell 204 by the processor 100 and fetches the request packets from the video request queue 274 in response.

The request packets 250 and queues 272–278 reside in system memory 112 and the processor 100 and controller 125 employ the request packets and queues to communicate. Thus, the processor 100 must generate at most one PCI bus access, i.e., to the $RQ_n\_REG$ to ring the doorbell 204, in order to submit a request to the device 122/123 thereby advantageously minimizing thrashing the PCI bus 114 as done by prior art systems.

Once the video request packets have been submitted, the processor 100 determines whether or not more video sub-picture data is to be sent to the video device 122, in step 810. If more video sub-picture data is to be sent, the processor 100 determines if a request packet is available from the solicited packet pool 200, in step 812. Preferably, the processor 100 executes a function call to the device driver 230 to request a free request packet from the solicited packet pool 200. If the processor 100 obtains a free request packet, the processor 100 populates the request packet with the appropriate information, as described above. The processor 100 then adds the populated request packet to a list of request packets to be submitted to the request queue 274 associated with the video sub-picture request channel 606, in step 814. The processor 100 then rings the video sub-picture request channel 606 doorbell 204 by writing a "1" to bit 0 of the $RQ_2\_REG$, in step 816. The video sub-picture request channel detects the ringing of the doorbell 204 by the processor 100 and fetches the request packets from the video sub-picture request channel request queue 274 in response.

Once the video sub-picture request packets have been submitted, the processor 100 determines whether or not more audio data is to be sent to the audio device 123, in step 818. If more audio data is to be sent, the processor 100 determines if a request packet is available from the solicited packet pool 200, in step 820. Preferably, the processor 100 executes a function call to the device driver 230 to request a free request packet from the solicited packet pool 200. If the processor 100 obtains a free request packet, the processor 100 populates the request packet with the appropriate information, as described above. The processor 100 then adds the populated request packet to a list of request packets to be submitted to the request queue 274 associated with the audio request channel 610, in step 822. The processor 100 then rings the audio request channel 610 doorbell 204 by writing a "1" to bit 0 of the $RQ_3\_REG$, in step 824. The audio request channel detects the ringing of the doorbell 204 by the processor 100 and fetches the request packets from the audio request channel request queue 274 in response.

Therefore, the controller 125 advantageously enables the processor 100 to submit request packets for each of the request channels in a concurrent manner. That is, the processor 100 is decoupled from the controller 125 with regard to request submissions. The processor 100 may asynchronously submit requests to the controller 125 thereby freeing the processor 100 to perform other tasks while the controller 125 performs the requested fetching of the request packets and transfers of video and audio data. Furthermore, the processor 100 may asynchronously submit requests for each of the audio and video devices 123/122 concurrently, thereby improving the performance of the system C and minimizing the possibility of either of the devices 122/123 not receiving data at a required minimum data rate. That is, the system C does not operate like traditional systems wherein the processor 100 waits until a data transfer has been completed to one multimedia device before performing a data transfer to another device.

After submitting request packets for audio, video and video sub-picture data to be transferred to the devices 122/123, the processor 100 determines if any request packets have been completed, in step 826. That is, the processor 100 checks to see if the controller 125 has placed a completed request packets in the completion queue 276. As described above, the completion queue 616 hardware of the controller 125 places completed request packets on the completion queue 276 in system memory. In one embodiment, the processor 100 checks the completion queue 276 in response to an interrupt request generated by the controller 125 to the processor 100. If no completed request packets require processing, the processor 100 returns to submitting requests.

If there are request packets in the completion queue 276, the processor 100 walks the list of request packets in the completion queue 276 and processes each of the request packets in the completion queue, in step 828. Preferably, processing a completed request packet comprises the device driver 230 removing the completed request packet from the completion queue 276 and notifying the appropriate host software 220 of the completion of the request packet. The processor 100 returns the request packet to the free queue 272, in step 832 or returns the request packet to the posted queue 278, in step 834 after determining in step 830 if the completed request packet is a solicited or unsolicited request packet.

Therefore, the controller 125 advantageously enables the processor 100 to process completed request packets for each of the request channels in a concurrent manner. That is, the processor 100 is decoupled from the controller 125 with regard to request packet completions. The controller 125 may asynchronously complete requests to the processor 100 thereby freeing the processor 100 to perform other tasks while the controller 125 performs the transfers of video and audio data and the completing of the request packets. Furthermore, the processor 100 may asynchronously complete requests for each of the audio and video devices 123/122 concurrently, thereby improving the performance of the system C and minimizing the possibility of either of the devices 122/123 not receiving data at a required minimum data rate. That is, the system C does not operate like traditional systems wherein the processor 100 waits until a data transfer has been completed to one multimedia device before performing a data transfer to another device.

The processor 100 continues steps 802 through 834 as long as video, video sub-picture or audio data are ready to be sent to the audio/video devices 123/122 and free request packets are available or as long as request packets have been completed. Preferably, the device driver 230 includes a means for the host software 220 to request an increase in the number of request packets in the solicited packet pool 200 and/or unsolicited packet pool 202 when necessary.

Figure 9:
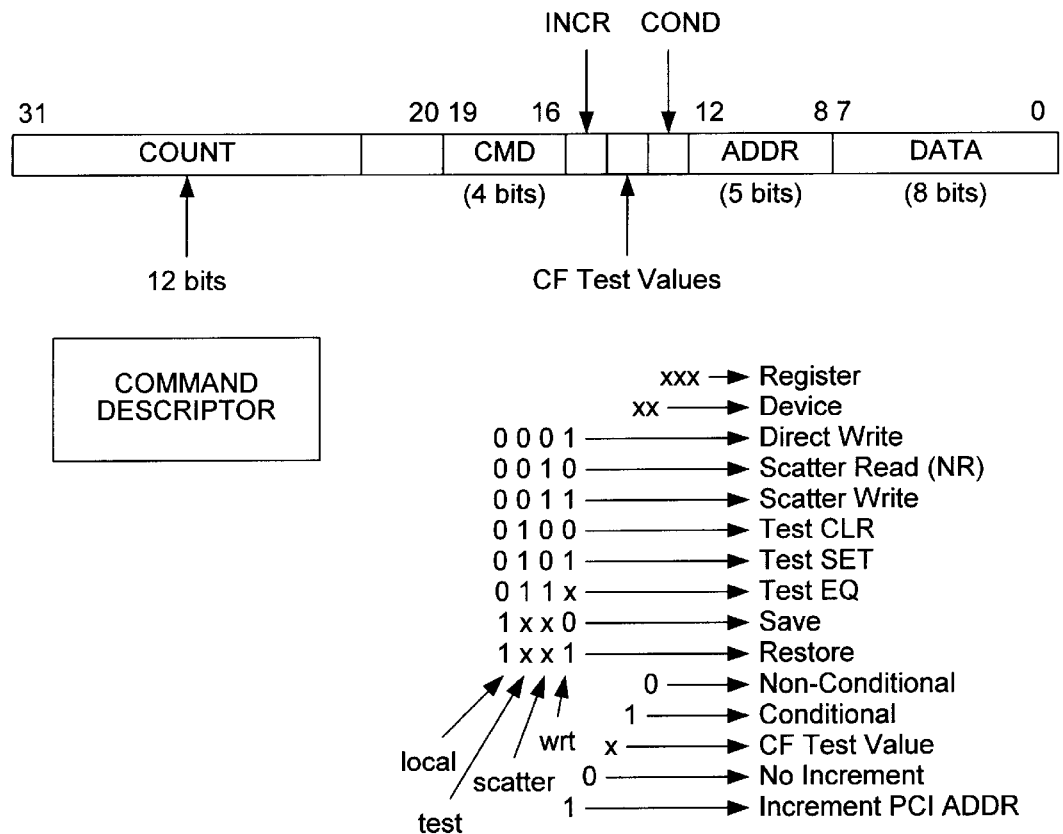
FIG. 9 is an illustration of command descriptors included in the payload of the request packets of FIG. 3.
Figure 9:
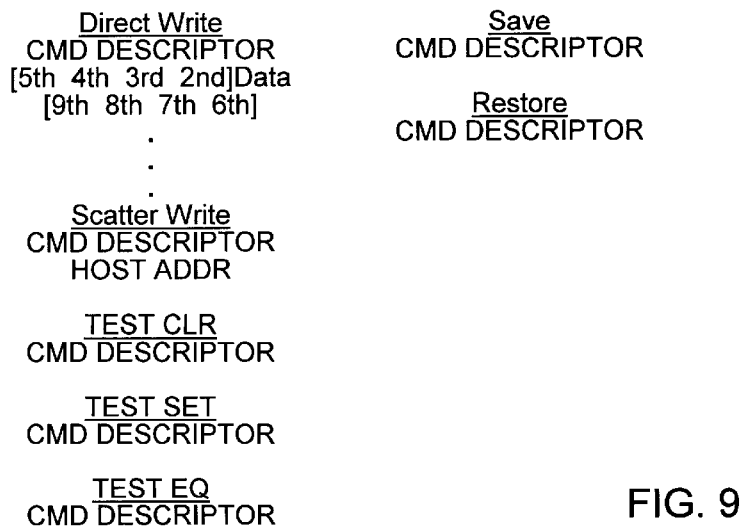

FIG. 9—Command Descriptor

Referring now to FIG. 9, an illustration of the format of a command descriptor such as those included in the payload 254 of request packets 250 is shown. The command descriptor is a 32-bit word as shown. One or more command descriptors may be included in the payload 254 of a request packet 250. The command descriptors are interpreted by the request channels. The request channels perform various actions upon the devices 122/123 in response to the command descriptor contents. The command descriptor includes a 12 bit count field, a 4 bit command field, a 5 bit address field, an 8 bit data field, a 1 bit increment field, a one bit conditional field and a 1 bit CF test value field as shown.

The command descriptor includes a 4 bit command field as shown. The command field defines a number of commands which the request channel may perform. In particular, the commands are a direct write, scatter read, scatter write, test clear, test set, test equal, save and restore. The meanings of the other fields in the command descriptor will be described with reference to the individual commands.

In response to the direct write command, the request channel writes data to the device 122/123 associated with the request channel. The format of the direct write command includes the command descriptor and one or more words of data in the payload 254 as shown. The number of bytes written to the device 122/123 is specified in the count field. The data written to the device 122/123 is the data in the one or more words of data directly following the command descriptor. The data is written to the register address specified in the lower 3 bits of the address field. The data is written to the device on the video bus 628 or audio bus 630 specified in the upper 2 bits of the address field.

The scatter write command instructs the request channel to control the corresponding DMA channel to transfer data, i.e., video or audio data, from system memory 112 to the device 122/123 associated with the channel. The format of the scatter write command includes the command descriptor and a 32-bit host address word following the command descriptor in the payload 254. The host address is the physical address in system memory 112 where the scatter/gather list resides. The length of the scatter/list is specified in the count field of the command descriptor. The scatter/gather list is a list of address/count pairs which describe the locations and amounts of data to be transferred. The addresses are physical addresses of system memory 112 and the counts specify the number of bytes to be transferred. Preferably, the physical address may reside on any byte boundary. The scatter read command performs a similar function but is used to transfer data from the devices 122/123 to system memory 112. If the increment field is set to I then the PCI bus 114 address specified in the scatter/gather list is incremented when reading data from the PCI bus 114. Typically, the increment field is set to 1 when reading from system memory 112. However, the controller 125 may also be used to read data from other PCI bus devices. The other PCI bus devices may include hardware FIFOs, for example, which reside at a fixed PCI bus address. Thus, in this situation the increment field would be set to 0.

The test commands—test clear, test set and test equal—instruct the request channel to test for specified conditions in registers of the specified device. The 8 bit data field is used in the test commands to specify the conditions to test for. The count field specifies the maximum number of times the specified condition is tested for. That is, the request channel will spin reading the specified register in the specified device until the specified condition is true or until the condition has been tested for the maximum number of times. The test commands may be used to conditionally execute the next command in the payload 254 by setting the condition field in the next command to a value of 1. Thus, the direct write and test commands enable device 122/123 registers accesses to be performed by the controller in response to the command descriptors issued by the processor 100, thereby decoupling the processor 100 from the devices 122/123.

The save command instructs the request channel to read the specified register in the specified device and save away the value read in a local storage area. The restore command instructs the request channel to write the value saved away in the local storage area to the specified register in the specified device.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A multi-media controller adapted for operation in a computer system including a processor, an input/output (I/O) bus and system memory operably coupled together, the controller comprising:

a video direct memory access (DMA) channel and an audio direct memory access (DMA) channel, each of which are operably coupled to the input/output bus;

a video request channel operably coupled to fetch a video request packet from the system memory to effectuate transfer of a video data stream from the system memory through the video DMA channel;

an audio request channel operably coupled to fetch an audio request packet from the system memory to effectuate transfer of an audio data stream from the system memory through the audio DMA channel, wherein said video DMA channel is operable to transfer said video data stream independent of and concurrent with said audio DMA channel transferring said audio data stream;

a video sub-picture DMA channel operably coupled to the input/output bus; and a video sub-picture request channel operably coupled to fetch a video sub-picture request packet from the system memory to effectuate transfer of a video sub-picture data stream from the system memory through the video sub-picture DMA channel.

2. A multi-media controller adapted for operation in a computer system including a processor, an input/output (I/O) bus and system memory operably coupled together, the controller comprising:

a video direct memory access (DMA) channel and an audio direct memory access (DMA) channel, each of which are operably coupled to the input/output bus;

a video request channel operably coupled to fetch a video request packet from the system memory to effectuate transfer of a video data stream from the system memory through the video DMA channel;

an audio request channel operably coupled to fetch an audio request packet from the system memory to effectuate transfer of an audio data stream from the system memory through the audio DMA channel, wherein said video DMA channel is operable to transfer said video data stream independent of and concurrent with said audio DMA channel transferring said audio data stream;

a second audio DMA channel operably coupled to the I/O bus for transferring a second audio data stream from an audio device to the system memory; and a posted request channel operably coupled to the I/O bus for fetching an unsolicited request packet from the system memory, wherein said unsolicited request packet includes at least one address of at least one data buffer in the system memory, wherein said posted request channel is operable to provide said at least one data buffer address to said second audio DMA channel, wherein said second audio DMA channel is operable to transfer said second audio data stream to said at least one data buffer in response to said posted request channel providing said at least one data buffer address to said second audio DMA channel.

3. A multi-media controller adapted for operation in a computer system including a processor, an input/output (I/O) bus and system memory operably coupled together, the controller comprising:

a video direct memory access (DMA) channel and an audio direct memory access (DMA) channel, each of which are operably coupled to the input/output bus;

a video request channel operably coupled to fetch a video request packet from the system memory to effectuate transfer of a video data stream from the system memory through the video DMA channel;

an audio request channel operably coupled to fetch an audio request packet from the system memory to effectuate transfer of an audio data stream from the system memory through the audio DMA channel, wherein said video DMA channel is operable to transfer said video data stream independent of and concurrent with said audio DMA channel transferring said audio data stream; and wherein said controller is operable to prioritize the transferring of said video data stream from the system memory to a video device relative to the transferring of said audio data stream from the system memory to an audio device.

4. A multi-media computer system, comprising:

a processor, I/O bus and system memory operably coupled together;

a video device;

an audio device;

a controller configured to couple said audio and video devices to said I/O bus, comprising:

a video direct memory access (DMA) channel operably coupled between the I/O bus and the video device for transferring a video data stream from the system memory to the video device;

a video request channel operably coupled to the I/O bus for fetching a video request packet from the system memory and controlling said video DMA channel to transfer said video data stream in response to said video request packet;

an audio DMA channel operably coupled between the I/O bus and the audio device for transferring an audio data stream from the system memory to the audio device;

an audio request channel operably coupled to the I/O bus for fetching an audio request packet from the system memory and controlling said audio DMA channel to transfer said audio data stream in response to said audio request packet;

wherein said video DMA channel is operable to transfer said video data stream independent of and concurrent with said audio DMA channel transferring said audio data stream;

wherein said processor is operable to decompress a compressed digital audio data stream and write said decompressed digital audio data stream to said system memory, wherein said controller is operable to transfer said decompressed digital audio data stream to said audio device via said audio DMA channel, wherein said audio device comprises an audio digital to analog converter (DAC) for converting said decompressed digital audio data stream into an analog audio signal; and wherein said controller is operable to selectively transfer said compressed digital audio data stream and said decompressed digital audio data stream from said system memory based upon a determination by said processor whether to decompress said compressed digital audio data stream or to request said controller to transfer said compressed digital audio data stream to said audio device and allow said audio device to decompress said compressed digital audio data stream.

5. A multi-media computer system, comprising:

a processor, I/O bus and system memory operably coupled together;

a video device;

an audio device;

a controller configured to couple said audio and video devices to said I/O bus, comprising:

a video direct memory access (DMA) channel operably coupled between the I/O bus and the video device for transferring a video data stream from the system memory to the video device;

a video request channel operably coupled to the I/O bus for fetching a video request packet from the system memory and controlling said video DMA channel to transfer said video data stream in response to said video request packet;

an audio DMA channel operably coupled between the I/O bus and the audio device for transferring an audio data stream from the system memory to the audio device;

an audio request channel operably coupled to the I/O bus for fetching an audio request packet from the system memory and controlling said audio DMA channel to transfer said audio data stream in response to said audio request packet;

wherein said video DMA channel is operable to transfer said video data stream independent of and concurrent with said audio DMA channel transferring said audio data stream;

wherein said processor is operable to decompress a compressed digital video data stream and write said decompressed digital video data stream to said system memory, wherein said controller is operable to transfer said decompressed digital video data stream to said video device via said video DMA channel, wherein said video device comprises a video digital to analog converter (DAC) for converting said decompressed digital video data stream into an analog video signal; and wherein said controller is operable to selectively transfer said compressed digital video data stream and said decompressed digital video data stream from said system memory based upon a determination by said processor whether to decompress said compressed digital video data stream or to request said controller to transfer said compressed digital video data stream to said video device and allow said video device to decompress said compressed digital video data stream.

6. A multi-media computer system, comprising:

a processor, I/O bus and system memory operably coupled together;

a video device;

an audio device;

a controller configured to couple said audio and video devices to said I/O bus, comprising:
- a video direct memory access (DMA) channel operably coupled between the I/O bus and the video device for transferring a video data stream from the system memory to the video device;
- a video request channel operably coupled to the I/O bus for fetching a video request packet from the system memory and controlling said video DMA channel to transfer said video data stream in response to said video request packet;
- an audio DMA channel operably coupled between the I/O bus and the audio device for transferring an audio data stream from the system memory to the audio device;
- an audio request channel operably coupled to the I/O bus for fetching an audio request packet from the system memory and controlling said audio DMA channel to transfer said audio data stream in response to said audio request packet;
- wherein said video DMA channel is operable to transfer said video data stream independent of and concurrent with said audio DMA channel transferring said audio data stream;
- a video sub-picture DMA channel operably coupled between the I/O bus and the video device for transferring a video sub-picture data stream from the system memory to the video device; and
- a video sub-picture request channel operably coupled to the I/O bus for fetching a video sub-picture request packet from the system memory and controlling said video sub-picture DMA channel to transfer said video sub-picture data stream in response to said video sub-picture request packet.

7. A method for performing multimedia operations in a system including a processor, I/O bus and system memory operably coupled together, wherein the computer system further includes a controller coupled to the I/O bus for transporting data between the system memory and video and audio devices, the method comprising:

submitting a first request packet to said controller for transferring a first data stream from said system memory to a first of said devices;

transferring said first data stream from said system memory to said first of said devices in response to said processor submitting said first request packet to said controller;

notifying said processor of the completion of said controller transferring said first data stream from said system memory to said first of said devices;

submitting a second request packet to said controller for transferring a second data stream from said system memory to a second of said devices;

submitting said second request packet to said controller is performed prior to said controller notifying said processor of the completion of said controller transferring said first data stream; and transferring said second data stream from said system memory to said second of said devices in response to said processor submitting said second request packet to said controller;

notifying said processor of the completion of said controller transferring said second data stream from said system memory to said second of said devices;

transferring said second data stream and said controller notifying said processor of the completion of said controller transferring said second data stream are performed prior to said controller transferring said first data stream and said controller notifying said processor of the completion of said controller transferring said first data stream.

* * * * *